United States Patent [19]
Braun et al.

[11] 4,022,983
[45] May 10, 1977

[54] TELEPHONE SWITCHING SYSTEM HAVING AUTOMATED CALL HOLD FACILITIES

[75] Inventors: Edwin Julius Braun; Michael Stephen Lane; Henry August Meise, Jr., all of Boulder; George William Taylor, Broomfield, all of Colo.

[73] Assignee: Bell Telephone Laboratories, Incorporated, Murray Hill, N.J.

[22] Filed: July 2, 1975

[21] Appl. No.: 592,610

[52] U.S. Cl. .............................................. 179/18 B
[51] Int. Cl.² ......................................... H04M 3/42
[58] Field of Search ................... 179/18 BD, 18 BG

[56] References Cited
UNITED STATES PATENTS 3,859,474  1/1975  Gueldenpfennig et al. ... 179/18 BD Primary Examiner—William C. Cooper
Attorney, Agent, or Firm—David H. Tannenbaum

[57] ABSTRACT

A wired logic PBX switching system is disclosed in which a camp-on circuit is used to provide automated call hold service. A station user places an existing call on hold by flashing the station switchhook contacts and dialing a predetermined code. The dialing of the code disconnects the station from the first call and places the trunk circuit serving the first call on hold. A second call may then be placed from the station. Upon termination of the second call, the hold condition is removed from the trunk circuit and a connection is reestablished from the trunk circuit to the station.

17 Claims, 16 Drawing Figures

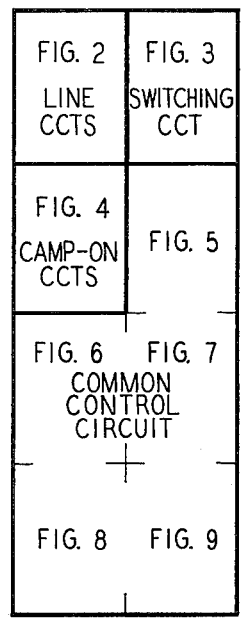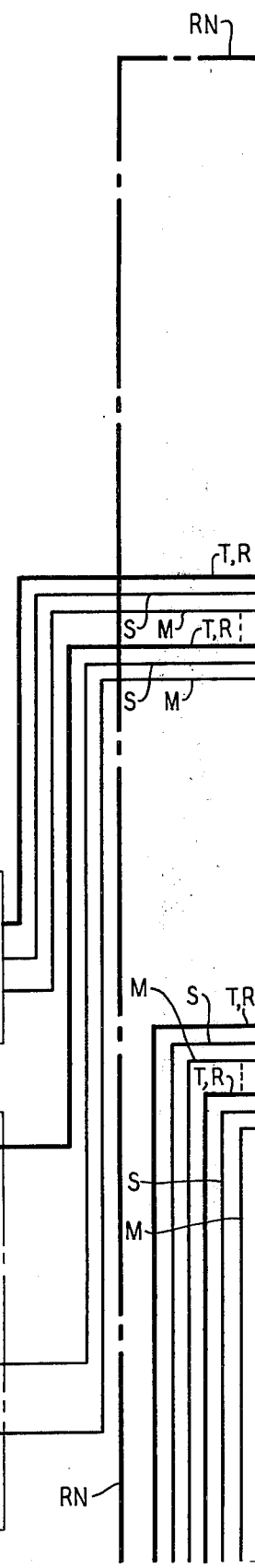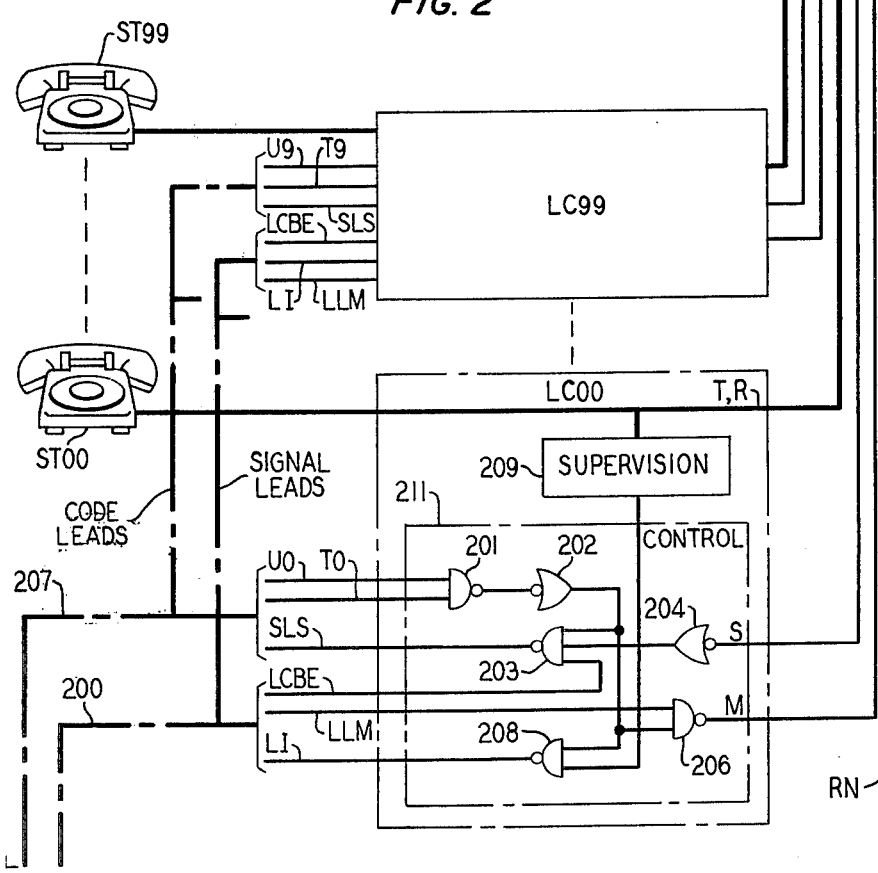

MODE CONTROL

TELEPHONE SWITCHING SYSTEM HAVING AUTOMATED CALL HOLD FACILITIES

BACKGROUND OF THE INVENTION

This invention relates to a telephone system and in particular to a Private Branch Exchange (PBX) system which enables calls to be placed on hold. This invention further relates to a PBX system in which a station user may dial a perdetermined code to place a call on hold and then initiate a new call while still keeping the original call on hold.

DESCRIPTION OF THE PRIOR ART

In private branch telephone systems it is common practice and obviously desirable to provide facilities whereby calls may be placed on hold. These facilities are generally key telephone facilities and comprise common equipment as well as a plurality of pushbutton keys on each station subset. One key is a call hold key, one key a PBX line key, and additionally either an intercom key or a second PBX line key is provided in order than one call may be placed on hold while another is originated. Although this key arrangement permits a call directed to a station to be placed on hold while another call is originated, the required common and station key equipment is sufficiently complex and expensive so that its application has been limited.

In telephone switching systems there is, therefore, a need for inexpensive equipment to provide key telephone features, such as call hold. This is especially true when the telephone switching system serving the customer is a Private Branch Exchange. The great cost of PBX systems in addition to the large number of PBX systems in service make it desirable for any new key telephone arrangement to utilize as much existing common PBX equipment as possible in order to reduce the cost of providing these key telephone features.

It is obviously desirable to have a system provide key telephone features exclusively utilizing the existing PBX circuitry without the addition of common key equipment. It is also desirable to provide the key telephone features without the use of the expensive pushbutton telephone subsets.

In view of the foregoing, an object of this invention is to provide inexpensive automated call hold facilities for use in PBX telephone systems.

It is a further object of this invention to provide call hold facilities by utilizing existing PBX circuitry.

It is a further object of this invention to provide call hold facilities independent of the use of pushbutton telephone subsets.

It is a further object of this invention to provide call hold facilities activated by a simple operation by the telephone subset user.

SUMMARY OF THE INVENTION

In accordance with our invention, we provide facilities in a wired logic common control PBX system which permit calls directed to or originated by any station user to be placed on hold by the dialing of a predetermined code by the user. The call hold facilities are activated when a subscriber engaged in an existing call flashes the switchhook of the station subset and then dials the digits of a predetermined code representing a request for call hold service. The flashing of the switchhook causes the common control circuit of the PBX to release the direct network connection between the station and the calling trunk circuit that is to be held.

A call transfer circuit is then connected to both of these circuits. Also, a digit register is connected by the network to the call transfer circuit. The call transfer circuit places the calling trunk circuit on hold and establishes a connection between the controlling station and the digit register. The station user hears dial tone at this time and dials the digits of the call hold code. The dialing of this code into the register signals the common control circuit that the trunk to which the station is now connected via the call transfer circuit should be placed on hold. At this time, the common control circuit determines the identity of the station and stores this information in an idle camp-on circuit. Then, the common control circuit breaks down the network connections between (1) the line circuit and the call transfer circuit, and (2) the register and the call transfer circuit. At the same time, the call transfer circuit is connected via the network to the camp-on circuit maintaining the call transfer circuit busy. The call transfer circuit maintains the trunk in an active noncommunicating condition, that is, on hold. The line circuit is connected to a digit register circuit so that the station user may initiate a new call in the conventional manner.

The held call remains connected by the call transfer circuit to the camp-on circuit as long as the station user has not terminated the new call and gone on-hook. Termination is accomplished either by placing the new call on hold utilizing the automated call hold facilities or transferring the call to another station or by the station user going on-hook at the end of the newly initiated call. When the station user terminates the new call, the line circuit is connected to the call transfer circuit by the network, and ringing voltage is applied to the line by the call transfer circuit. The station user then answers the call and the common control circuit (1) breaks down the network connections between the line circuit and the call transfer circuit, (2) breaks down the network connections between the trunk circuit and the call transfer circuit, and (3) establishes a new connection by the network from the line circuit to the trunk circuit. The station user may then resume communicating with the party that was placed on hold.

Accordingly it is a feature of the invention to provide circuitry in a switching system which is responsive to a switchhook flash by the station user to enable the station user to place a call on hold by dialing a predetermined call hold code.

A further feature of the invention is the provision of facilities for enabling the station user who has placed a call on hold by utilizing the call hold feature to use his subset to initiate a new call.

A further feature of the invention is the provision of facilities for scanning each station that has placed a call on hold to determine whether that station is still engaged in its newly initiated call.

A still further feature is the provision of facilities responsive to a determination that the scanned station is idle for establishing a new network connection between the trunk circuit that was placed on hold and the idle station.

BRIEF DESCRIPTION OF THE DRAWING

The operation and utilization of the present invention will be more fully apparent from the following description of the drawing, in which:

FIGS. 2–9 are a detailed circuit diagram of a preferred embodiment of the invention;

FIG. 10 shows the manner in which FIGS. 2–9 should be arranged;

GENERAL DESCRIPTION – FIG. 1

Figure 1:
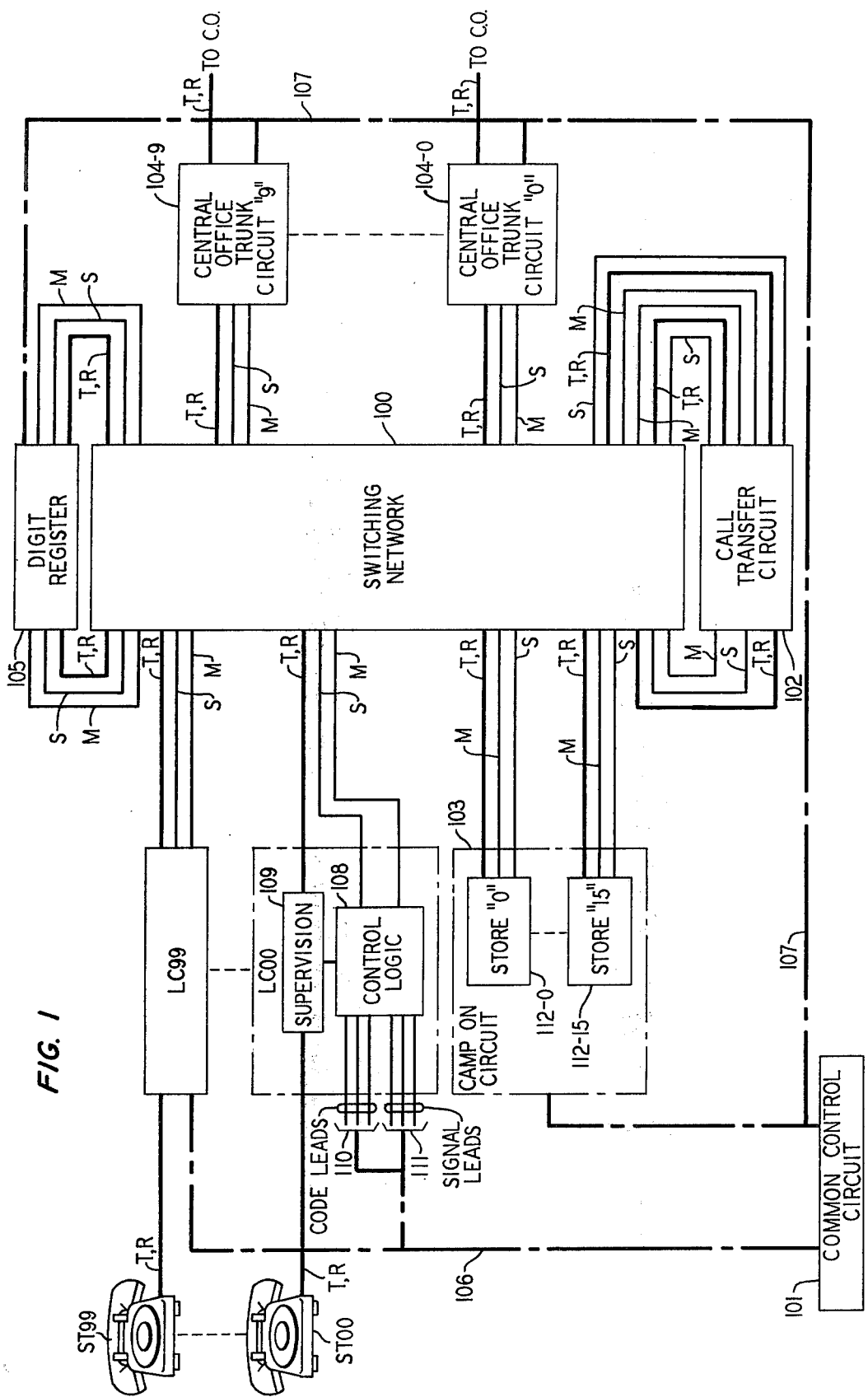
FIG. 1 illustrates one embodiment of the invention in block diagram form.

FIG. 1 shows the broader system aspects of our invention as embodied in a wired logic electronic type PBX of the type disclosed in detail in the H. H. Abbott et al., U.S. Pat. No. 3,377,432, issued Apr. 9, 1968. The Abbott et al. specification is hereby incorporated as a part of the present specification to the same extent as if fully set forth herein.

The system comprising our invention includes an end-marked switching network which is designated as element 100 on FIG. 1. It further includes a plurality of PBX stations ST00 through ST99, each of which is connected to one of line circuits LC00 through LC99. Each line circuit is connected to the switching network 100 and is additionally connected by means of various conductors (106) to the common control circuit 101. These conductors enable the common control to scan, identify, and select any line circuit as well as to receive signals from the line circuits indicating their current conductive states.

The disclosed embodiment also includes a plurality of registers, such as register 105, a plurality of call transfer circuits, such as call transfer circuit 102, and a plurality of trunk circuits such as trunk circuit 104-0 through 104-9 as well as a camp-on circuit 103. The camp-on circuit contains a plurality of camp-on stores 112-0 to 112-15 each of which can provide camp-on service for a different call. The line circuits and camp-on circuit are connected to the left side (the line side) of the network while the trunk circuits are connected to the right side (the trunk side). Each register has both a line side and a trunk side network appearance in order that it may be connected by the network to a trunk circuit on an incoming call or to a line circuit on an outgoing or intra-PBX call. Each call transfer circuit has both a line side and a plurality of trunk side network appearances in order that it may be connected by the network either to a trunk circuit, a line circuit, or a digit register. The switching network is of the end-marked type and in response to the presence of a marking potential on either side thereof it establishes, independently of the remainder of the system, a network interconnection between the circuits associated with the marked terminals.

The disclosed system is of the common control type, in which the common control 101 governs the order in which various circuits are interconnected by the switching network during the serving of each call. The common control circuit receives call service requests from the line circuits, from the registers, from the call transfer circuits, from the camp-on circuit, and from the trunk circuits. Upon the receipt of each such request, the common control circuit regulates the operation of the requesting circuit and controls the establishment of a network connection between the requesting circuit and any circuit of the system with which the requesting circuit is to be connected. This operation is more fully described in the Abbott et al. patent. The serving of a call may require a plurality of network connections to be established sequentially.

Each line circuit includes a control logic element 108 which has a plurality of transistor gates which are selectively controlled to assume either an ON or an OFF conductive state. A gate is said to be ON whenever it receives energizing potentials at all of its inputs, and is said to be OFF when energizing potentials are not applied to all of its inputs. The conductive state of the line circuit gates is jointly controlled by the supervision circuit 109 within each line circuit, by the code leads 110 and by the signal leads 111. The code leads 110 and the signal leads 111 comprise the conductors 106 to the common control circuit.

Signals indicating the conductive states of the line circuit gates are transmitted over the signal leads 111 to the common control circuit. These signals enable the common control circuit to monitor the state of the line circuits and, by means of prewired logic, to determine whether a line circuit requires action by the common control circuit with regard to either a call initiated by or directed to the line circuit. Included among the functions performed by the common control circuit in connection with the establishment of calls are the recognition of service requests from a calling line circuit when it initially goes off-hook; the identification of the calling line circuit so that it may be connected to a register circuit; the selection of a called line circuit following the reception of a called number by a register; the selection of a trunk circuit for interconnecting the calling and called stations; and the reidentification of a calling line circuit at the time it is to be connected to the selected trunk circuit and, in turn, to the called line circuit.

The operation of the system of FIG. 1 for the serving of calls not utilizing the call hold service is fully described in detail in the Abbott et al. patent. Therefore, in the following description we will only briefly review how such calls are served.

For purposes of our discussion it will be assumed that station ST00 originates an outgoing central office trunk call. This is done by station ST00 going off-hook which causes the common control circuit to establish a direct network connection between station ST00 and a register circuit 105. The telephone subscriber at station ST00 hears dial tone from the register circuit and dials a central office trunk access code, which is detected by the register circuit. The register signals the common control circuit that station ST00 is requesting connection to a central office trunk circuit and the common control circuit establishes a direct network connection between station ST00 and an idle central office trunk circuit. Let it be assumed that this idle trunk is trunk circuit 104-0. Station ST00 hears central office dial tone through the central office trunk circuit and then dials the required digits to complete the outgoing central office trunk call. It is further assumed that the telephone subscriber at station ST00 wishes to place this call on hold by utilizing the call hold service of the present invention in order that he may initiate another call.

The subscriber at station ST00 initiates the call hold operation by flashing the station set switchhook and then dialing the assigned call hold code. The switchhook flash from the subset is detected by the central office trunk circuit which, in turn, requests the common control circuit to connect this call to a call transfer circuit. The common control circuit responds to this request by selecting an idle call transfer circuit 102. The common control circuit then (1) releases the network connection between station ST00 and the central office trunk circuit 104-0, (2) causes line circuit LC00 to be connected via the network to the trunk side network appearance of the selected call transfer circuit 102, and (3) causes the central office trunk circuit 104-0 to be connected via the network to the line side network appearance of the same call transfer circuit 102. The common control circuit selects an idle digit register circuit 105 and connects this selected register's line side network appearance via the network to another trunk side network appearance of the same call transfer circuit 102. The call transfer circuit itself now places the central office trunk circuit on hold and closes a path to connect the line circuit LC00 to the register circuit. The telephone subscriber now hears dial tone from the register, by way of the call transfer circuit, and dials the digits representing the call hold code. The dialed digits representing the call hold code are received by the register circuit which, in turn, transmits the dialed digits representing the call hold code to the common control circuit. The call hold code is detected by the common control circuit and the common control initiates a register callback operation as described in the Abbott et al. patent. The function of the register callback operation is to identify the line circuit that is currently connected to the register, in this case line circuit LC00 which is requesting call hold service by way of the call transfer circuit 102. The common control circuit initiates the callback operation by applying a signal to one of the conductors 107 extending from the common control circuit to the register 105. This causes the register to apply a low callback signal to its line side sleeve lead appearance. This low signal is extended through the network by way of the call transfer circuit to the sleeve lead of the line circuit LC00.

Common control circuit 101 next identifies the called back line circuit by scanning the line circuits. The gate of line circuit LC00 turns off when this line circuit is scanned because of the negative callback potential on its sleeve lead. When the turn-off of this gate is transmitted to the common control circuit via conductors 106 the scanning operation is halted, and the common control circuit now has determined the identity of station ST00, which is the station requesting call hold service.

The present status of the call is that the subscriber at station ST00 who is requesting call hold service has now been identified, and the identity of the associated line circuit (LC00) is now stored in the line scanner. The common control circuit now locates an idle camp-on store, transfers the station identity to the selected camp-on store, and connects the central office trunk via the network and the call transfer circuit to this camp-on store. This places the central office party on hold and frees the station party to initiate a new call.

The common control circuit signals the camp-on circuit by means of conductors 107 and causes the camp-on circuit to search for an idle camp-on store. When an idle camp-on store is found, such as store 112-0, the common control circuit causes the identity of line circuit LC00 to be read into the camp-on circuit by way of conductors 107. The camp-on circuit compares this number to the numbers already stored in the other camp-on stores to assure that the station requesting call hold service is not already camped on. The identity of the requesting line circuit is then stored in the selected idle camp-on store 112-0 which now marks its line side network appearance by placing a low signal on conductor M.

The common control circuit initiates a callback operation to identify the circuit to which the camp-on store should be connected. The common control circuit, by means of conductors 107 signals the call transfer circuit to mark one of its trunk side network appearances. The common control circuit by means of conductors 107, signals the call transfer circuit 102 to release (1) the network connection between its trunk side network appearance and station ST00 and (2) the network connection between its trunk side network appearance and the register circuit. The common control circuit next causes the switching network to establish a connection between the marked line side network appearance of the camp-on store 112-0 and the marked trunk side network appearance of the call transfer circuit 102.

These operations complete the connection of the central office trunk circuit 104-0 to the camp-on circuit 103 by way of the call transfer circuit 102, thus placing the central office trunk circuit 104-0 on hold. The telephone subscriber at station ST00 is now free to initiate another call which may be terminated in a normal manner or transferred to another station or placed on hold utilizing the call hold service.

Each camp-on store periodically reads out its contents, which is a station number, to the common control circuit which uses this station number to determine the status of the associated line circuit. The details of this operation are more fully described in the Baker et al. U.S. Pat. No. 3,381,075, issued Apr. 30, 1968.

Let it be assumed that a camp-on store is requesting readout. This request is transmitted to the common control circuit on conductors 107 and the common control circuit causes the camp-on store to read out its contents on the conductors 107. Let it be assumed that the number read out from the camp-on store is the identity of a station that placed a call on hold utilizing the call hold service. Let it be further assumed that this station has just terminated new call and is now idle. The common control circuit then scans the line circuit and finds its status to be idle. The common control circuit signals the selected line circuit on conductors 106, causing the line circuit to mark its line side network appearance. The common control circuit now proceeds to reconnect this line circuit and its associated station to its original call and removes the central office trunk circuit from hold.

The common control circuit places a signal on one of conductors 107 causing the camp-on circuit to call back the call transfer circuit that is connected to the selected camp-on store. The callback operation is accomplished by the camp-on circuit placing a low signal on the sleeve lead to the call transfer circuit. This causes the call transfer circuit to mark its trunk side network appearance. The common control circuit signals the call transfer circuit on conductors 107 to drop the network connection between the call transfer circuit trunk side network appearance and the camp-on circuit. When this is done, a new network connection is established by the network between station ST00 and the call transfer circuit trunk side network appearance. The call transfer circuit now requests release of the network connections between the station and trunk circuits and the call transfer circuit by placing a signal on one of conductors 107 which extends to the common control circuit. The common control circuit responds to the signal and initiates a callback operation, causing line circuit LC00 to mark its line side network appearance and also causing central office trunk circuit 104-0 to mark its trunk side network appearance. The common control circuit then signals the call transfer circuit by means of conductors 107 to release the network connection between the call transfer circuit trunk side network appearance and line circuit LC00 and also to release the network connection between the call transfer circuit line side network appearance and central office trunk circuit 104-0. The common control circuit then causes the network to establish a new network connection between line circuit LC00 and central office trunk circuit 104-0. The central office party and the station party are then connected together as in the original call.

SEQUENCE CIRCUITS — FIGS. 11 THROUGH 14

Figure 13:
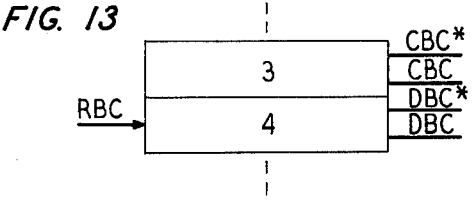
Figure 14:
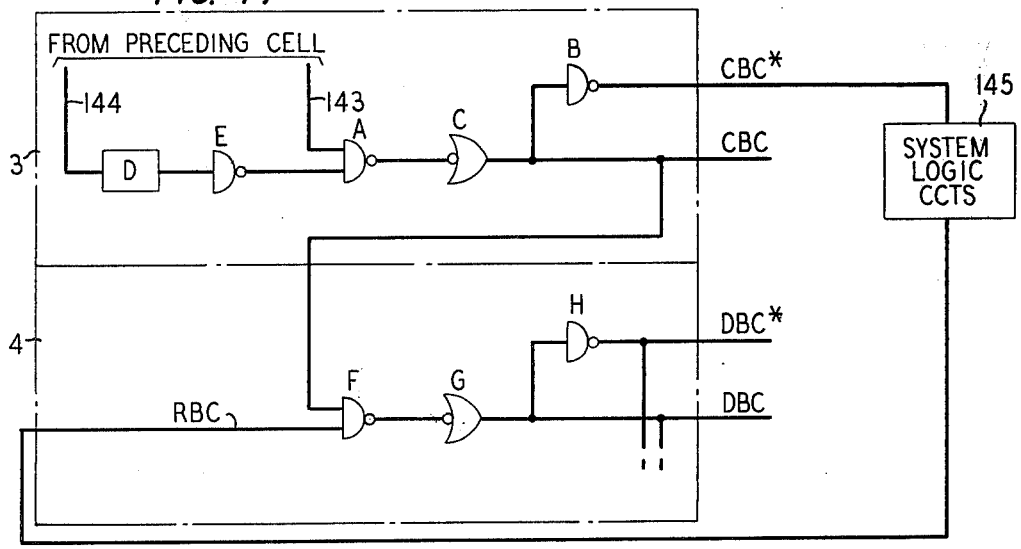
Figure 15:
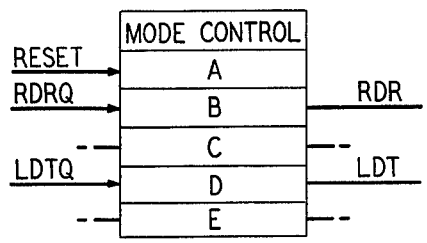
FIGS. 15–16 show a mode control circuit typical of the one used in the embodiment of the invention.
Figure 16:
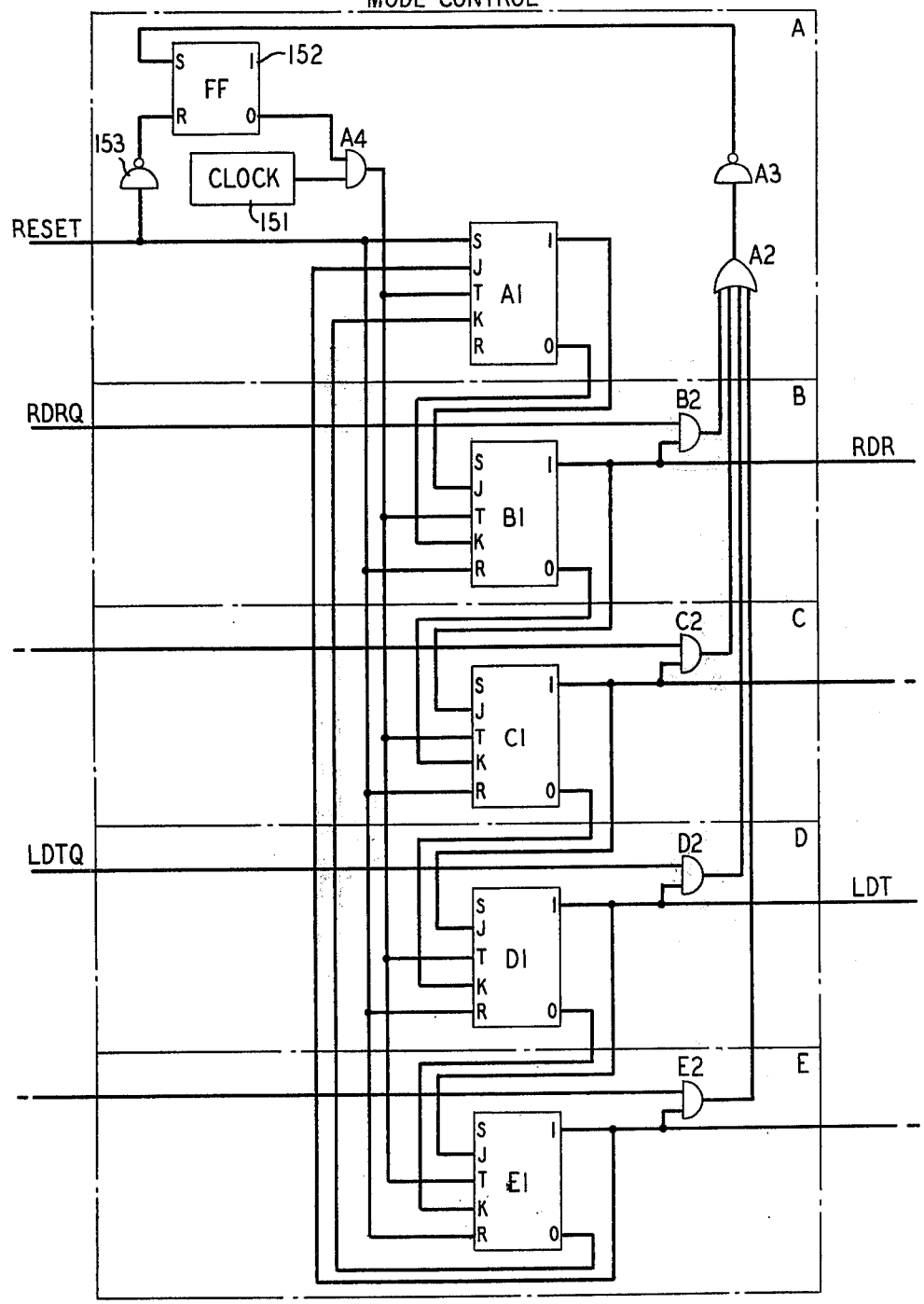

Before embarking on a detailed discussion of the operation of our invention it would be helpful to review the sequence circuits shown in FIGS. 11 through 14 and the mode control circuit shown in FIGS. 15 and 16. In particular, the common control circuit contains a plurality of sequence circuits whose function is to apply signals or control potentials to various portions and circuit elements of the system in a predetermined sequence. The complexity of the drawing has been reduced by representing the sequence circuits with symbols indicating their logical function, rather than by disclosing circuit details everywhere a sequence circuit appears on the drawing.

Figure 11:
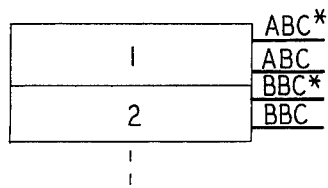
FIGS. 11–14 show sequence circuits typical of the ones used in the embodiment of the invention.
Figure 12:
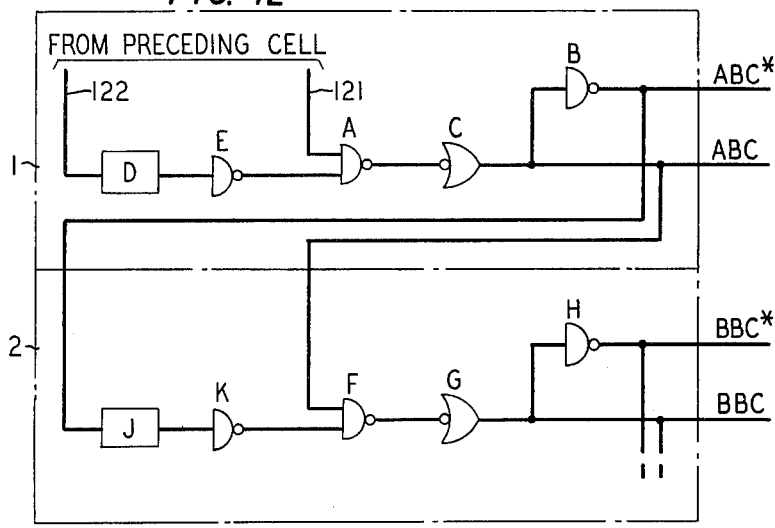

We use two types of sequence circuits in our system. The type shown in FIG. 11 has a plurality of stages or elements, of which two are shown and are designated 1 and 2. This type of sequence circuit, once it is activated, automatically steps from element to element without any response from the system. The circuit details of the sequence circuit of FIG. 11 are shown in FIG. 12. The sequence circuit of FIG. 13 is similar to that of FIG. 11, except that it does not step from element 3 to element 4 until it receives a system response on conductor RBC. FIG. 14 illustrates the circuit details of the circuit of FIG. 13.

The following describes the operation of the sequence circuits of FIG. 12. Stage 1 is enabled when both inputs of gate A go HIGH. The upper input of gate A is driven HIGH by a potential applied to conductor 121 from the preceding stage. A LOW on conductor 122 from the preceding stage is propagated, after a predetermined delay, through delay element D, applied to the input of inverting OR gate E, and applied as a HIGH to the lower input of gate A.

Gate A turns ON and drives its output LOW when both of its inputs go HIGH. The LOW on its output turns OFF gate C and drives conductor ABC HIGH. The HIGH from gate C turns ON gate B and drives conductor ABC* LOW. The potentials on conductors ABC and ABC* are applied to other elements of the system to control those elements in the performance of their assigned system functions. The potentials of these two conductors also extend to stage 2 of the sequence circuit to activate it in a manner analogous to that already described for stage 1. Specifically, the upper input of gate F is HIGH at this time from conductor ABC. The lower input of gate F is driven HIGH, after a predetermined delay, in response to the LOW on conductor ABC*. The purpose for the delay is so that the outputs from the first and second stages of the sequence circuit will have a predetermined sequence in time. When gate F turns ON after the predetermined delay, gate G turns OFF and drives conductor BBC HIGH and drives conductor BBC* LOW from gate H. This delay insures that conductors ABC and ABC* assume their active state and then, after a predetermined time, conductors BBC and BBC* will assume their active state as gates G and H respond to the turn-ON of gate F when both of its inputs go HIGH.

Conductors BBC and BBC* extend both to the next stage of the sequence circuit as well as to other elements of the system to control them in the performance of their system functions. The next stage of the sequence circuit is activated by the potentials on conductors BBC and BBC* in a manner analogous to that already described for elements 1 and 2.

The sequence circuits of FIGS. 11 and 12, as well as those of 13 and 14, operate in such a manner that the output conductors of an activated stage remain enabled with a HIGH or a LOW potential, as the case may be, when the sequence circuit steps to the next position to activate it. In other words, after the output conductors of a stage are enabled, they remain enabled when the sequence circuit steps through the remainder of its positions. The output conductors of each stage are disabled or reset to their normal state only when the enable potentials are removed from the control gate of the first stage; namely, the gate that corresponds to gate A of stage 1. The turn-OFF of that gate disables the outputs of all other stages of the sequence circuit.

The following describes the operation of the sequence circuit of FIGS. 13 and 14. Stage 3 operates in the same manner as described for stages 1 and 2 of FIG. 12. Namely, both inputs of gate A to HIGH; its output goes LOW; the output of gate C goes HIGH to conductor CBC; and the output of gate B goes LOW to conductor CBC*.

The output of gates B and C are connected to element 145 which is entitled "System Logic Circuits." The output of gate C also extends to the upper input of gate F. Element 145 receives the control potentials on conductor CBC*, performs its assigned system function, and then transmits a signal over conductor RBC to the lower input of gate F. The receipt of this signal indicates that the system function assigned to element 145 has been completed and that the sequence circuit may now step from position 3 to position 4. The simultaneous application of signals to the lower and upper inputs of gate F turns the gate ON, turns gate G OFF, and gate H ON. This drives conductors DBC HIGH and DBC* LOW in a manner similar to that already described.

The connections from stage 4 to the next stage depend upon whether the next stage must wait for a system response before it assumes its active state. If it is desired that the stepping action be automatic after a predetermined time delay, the next stage will be of the type shown for stages 1, 2, and 3, and conductors DBC and DBC* will supply its controlling potentials. On the other hand, if the next stage must wait for a system response before it becomes active, it will be of the type shown for stage 4. In this case, only one of its control potentials will be supplied by conductor DBC. Its other input will come from a system logic circuit over a conductor analogous to conductor RBC for element 4.

Each position of the sequence circuit of FIG. 14 that becomes active holds it output conductors enabled as the succeeding stages become active. All output conductors, once they are enabled, remain enabled until the entire sequence circuit is reset when an enabled potential is removed from one of the inputs of the AND gate corresponding to AND GATE A for element 3 provided that any external input signal to the position and all prior positions remain applied. The removal of an external signal turns OFF the controlling AND gate for the stage to which it is connected as well as to all subsequent stages.

MODE CONTROL — FIGS. 15 AND 16

Figure 9:
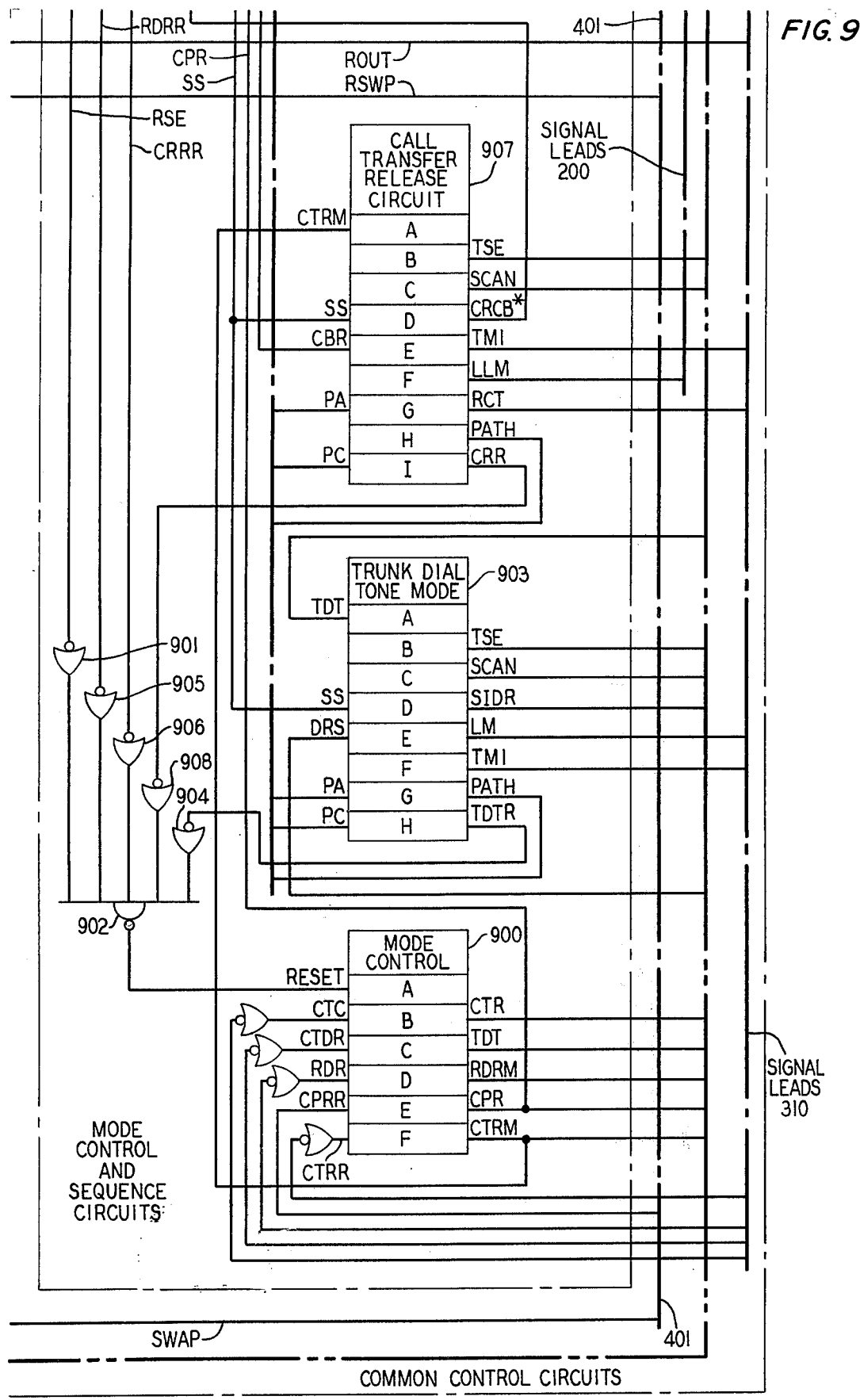

The mode control circuit, which is shown as element 900 on FIG. 9, is shown in further detail on FIGS. 15 and 16. FIG. 15 shows the mode control as having five sections designated A through E. Input conductors enter the left side of each section; output conductors extend from the right side, sections B, C, D, and E. The mode control of FIG. 16 is also subdivided into operational elements A through E; it further has input and output conductors that correspond to those of FIG. 15.

The mode control circuit of FIG. 16 uses JK flip-flops in a ring counter configuration. The clock 151 is connected via gate A4 to the T input of each flip-flop. At certain times, as subsequently described, the clock output pulses are effective to advance the operational state of the counter from stage-to-stage one step at a time.

Each JK flip-flop has inputs designated S, J, T, K and R; each JK flip-flop also has outputs designated 1 and 0. A HIGH on the R input resets a flip-flop. This causes its 0 output to be HIGH and its 1 output to be LOW. Conversely, a HIGH on the S input sets a flip-flop so that its 1 output is HIGH and its 0 output is LOW. The J input is functionally associated with the S input and the K input is associated with the R input. The J and K inputs differ from the S and R inputs in that a high input signal to either the J or K input is not effective to alter the state of the flip-flop unless the signal is received coincidentally with a clock pulse on the T input.

The J and K inputs of each flip-flop are connected to the 1 and 0 outputs, respectively, of the previous stage. Depending upon the conductive state of each flip-flop, one of its outputs is HIGH while the other is LOW. When a clock pulse is received on the T input of a flip-flop, it is set to the state of the previous stage under control of the signals applied to its J and K inputs. If the J input is HIGH, the flip-flop is set; if the K input is HIGH, the flip-flop is reset. JK flip-flops are well known in the art and, therefore, no further description of their operation is necessary.

The initial or rest condition of the mode control circuit of FIG. 16 occurs when a reset pulse is applied to the RESET conductor and, in turn, to the S input of flip-flop A1. The RESET conductor also extends to the input of gate 153 as well as to the R input of flip-flops B1, C1, D1, and E1. The reset signal is a HIGH and its application to the RESET conductor sets flip-flop A1 and resets any of flip-flops B1, C1, D1, or E1 that may have previously been in a set state. By means of gate 153, the reset signal also resets flip-flop 152. Subsequently, after the reset signal terminates, the clock pulses pass through gate A4 and advance the JK flip-flop counter chain step-by-step in response to the reception of each clock pulse. Thus, following the setting of flip-flop A1, the next clock pulse sets flip-flop B1 and resets flip-flop A1. The counter chain advances in this manner one step for each clock pulse received until a mode control request signal is received.

When a request is received for a particular mode such as, for example, mode B, the request signal on conductor RDRQ enables or primes the upper input of gate B2. Subsequently, when the counter advances to its position in which the B1 flip-flop is set, the 1 output of the flip-flop enables the lower input of gate B2. This turns the gate on and makes its output HIGH. This HIGH extends to an input of gate A2 which makes its output HIGH. This HIGH is inverted by gate A3 to a LOW. This LOW is extended to the set input of flip-flop 152 to switch it to a set state. The LOW on the 0 output of flip-flop 152 inhibits the upper input of gate A4 so that the clock pulses no longer pass through the gate to the JK flip-flops.

Flip-flop B1 remains set and its 1 output applies a HIGH to the RDR output conductor of element B. The mode control circuit remains in this state until a HIGH is subsequently received on the RESET conductor from one of the sequence circuits shown on FIG. 2. At this time, the reset signal sets the A1 flip-flop, resets flip-flop B1, and resets flip-flop 152. When the reset pulse terminates, the clock pulses are again applied to the JK flip-flops as described so that the circuit advances one step for each pulse until a subsequent service request signal is received. Because of the order in which the ring counter steps through its sequence, the stages have a preference. In the case of simultaneous mode requests, the highest preference mode is selected. After the mode control is again reset, the highest preference remaining mode request is served so that eventually all waiting mode requests are served.

OVERALL SYSTEM OPERATION — FIGS. 2, 3, 4, 5, 6, 7, 8, 9, 10

Drawing FIGS. 2, 3, 4, 5, 6, 7, 8, 9 when arranged with respect to each other as shown in FIG. 10, illustrate how the various elements of our inventive embodiment cooperate to provide hold control features. The various equipments, such as line circuits, trunk circuits, common control, et cetera, are oriented with respect to each other on FIGS. 2 to 9 in a manner analogous to that of FIG. 1.

The description of FIGS. 2 through 9 is made with reference to the same call conditions assumed for FIG. 1; namely, station ST00 is connected to an outgoing central office trunk call and station ST00 wishes to place this call on hold by utilizing the call hold service in order that he may initiate another call. It is also assumed that station ST00 is being served by central office trunk circuit 300-0.

CALL HOLD REQUEST

After a connection has been established the user at station ST00 initiates the call hold operation by momentarily depressing his switchhook and then dialing the assigned call hold code. The switchhook flash from the station subset is detected by the central office trunk circuit 300-0 (FIG. 3) which places a LOW signal on conductor CTC. The CTC signal from the CO trunk circuit is extended over cable 310 on FIG. 3 to the common control circuit on FIG. 9 where it is inverted by gate 909 and is terminated on the B section of the mode control circuit 900. The receipt of the signal on conductor CTC activates the B section of the mode control circuit 900 which causes the common control circuit to enter what is called the "call transfer request mode" in which the circuit requesting this service is connected to an idle call transfer circuit.

Figure 5:
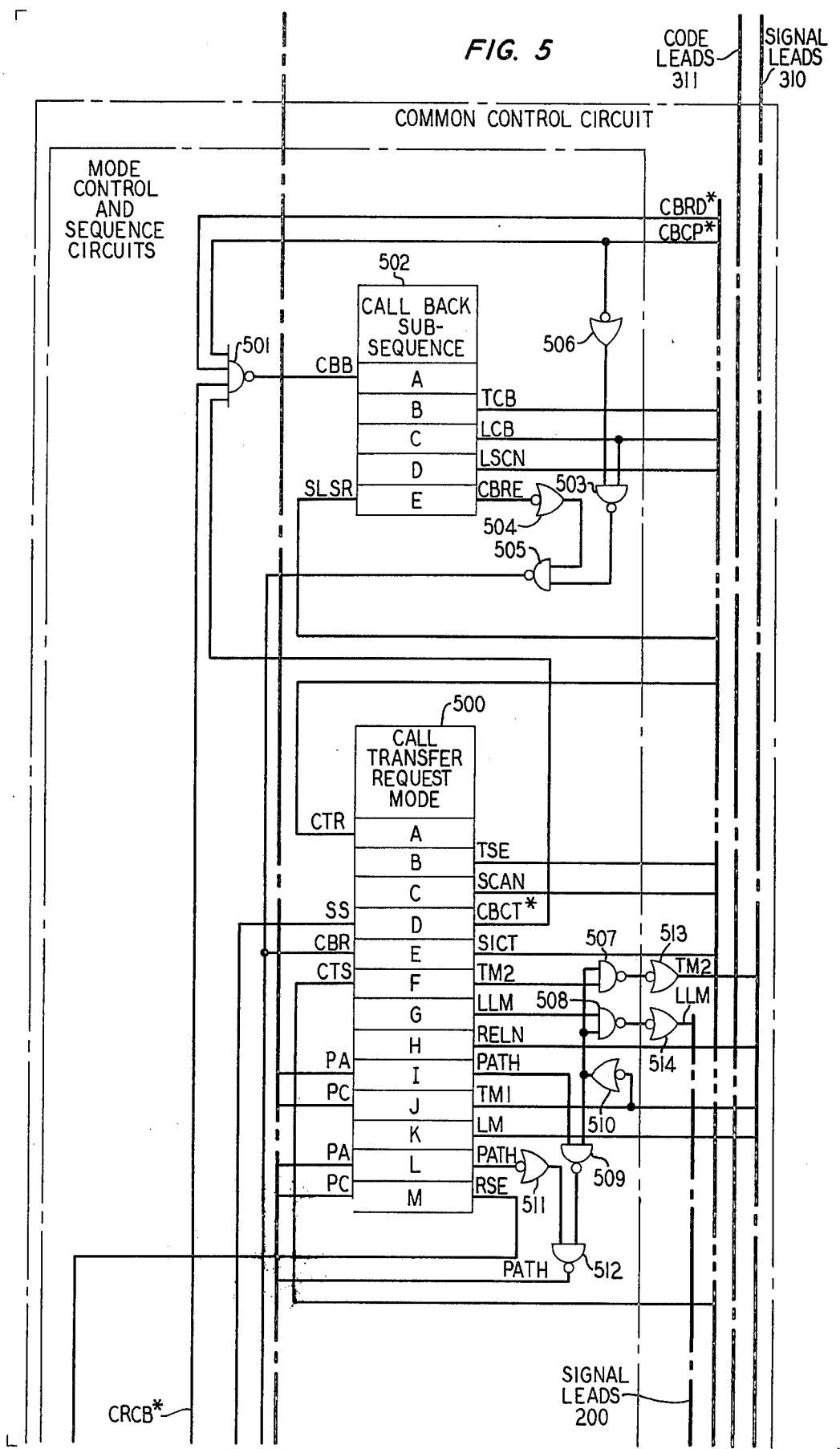

The B section of the mode control circuit places a HIGH signal on conductor CTR which activates the call transfer request mode circuit 500 on FIG. 5. Section B of the call transfer request mode circuit responds to the signal on lead CTR by placing a HIGH signal on conductor TSE. The HIGH signal on conductor TSE, in conjunction with the previously mentioned HIGH signal on conductor CTR, enables gate 601 of the service request scanner 600 of FIG. 6. The call transfer request mode circuit automatically steps to section C after a small time delay and places a HIGH signal on conductor SCAN. This HIGH signal causes gate 601 of the service request scanner to turn ON, placing a LOW signal on conductor TS. The LOW signal on conductor TS activates the trunk scanner portion 600A of the service request scanner. The trunk scanner sequentially places a HIGH signal on the code lead 311 conductors TO through T9 to the trunk circuits until a HIGH signal is returned from a trunk circuit on conductor STS one of code leads 311. The HIGH signal on conductor STS indicates that the trunk requesting service has been located. In the instant case, the trunk requesting service is the trunk in position 0 so when the trunk scanner places a HIGH signal on conductor TO, central office trunk circuit 300-0 will respond by returning a LOW signal on conductor STS, thereby stopping the trunk scanner. The signal on conductor STS also causes the service request scanner to return a HIGH signal on conductor SS to the call transfer request mode circuit. The signal on conductor SS causes the call transfer request mode circuit to advance to section D. Section D places a LOW signal on conductor CBCT* which turns OFF gate 501 on FIG. 5 thus placing a LOW signal on conductor CBB, which activates the callback subsequence circuit 502 also on FIG. 5.

CALLBACK OPERATION

A callback operation is now begun to determine the identity of the station connected to the trunk circuit requesting connection to the call transfer circuit. The callback operation is begun by the callback subsequence circuit 502 placing a HIGH signal on conductor TCB which turns ON gate 602 in the callback control circuit 603 on FIG. 6. Gate 602 turning ON causes gate 604 to turn OFF, placing a HIGH signal on conductor TCBE which is one of the signal leads 310 to the central office trunk circuit 300-0 on FIG. 3. The HIGH on conductor TCBE causes the central office trunk circuit to place a LOW signal on its conductor S to line circuit LC00, which is connected to the central office trunk circuit via the switching network 301. The callback subsequence circuit automatically advances to its section C and places a HIGH signal on conductor LCB. This signal on lead LCB does not affect gate 503 since it is already turned OFF by the LOW signal on its other input, but does turn ON gate 605 in the callback control circuit 603. Gate 605 turning ON causes gate 606 to turn OFF, placing a HIGH signal on the enable lead, conductor LCBE, which is connected to line circuit LC00 by way of signal leads 200. This completes the callback operation in which line circuit LC00 has been called back by the central office trunk circuit to which it is connected via the network. Line circuit LC00 has therefore been enabled so that the common control circuit may identify it.

CALLED BACK LINE CIRCUIT SCANNING

Figure 8:
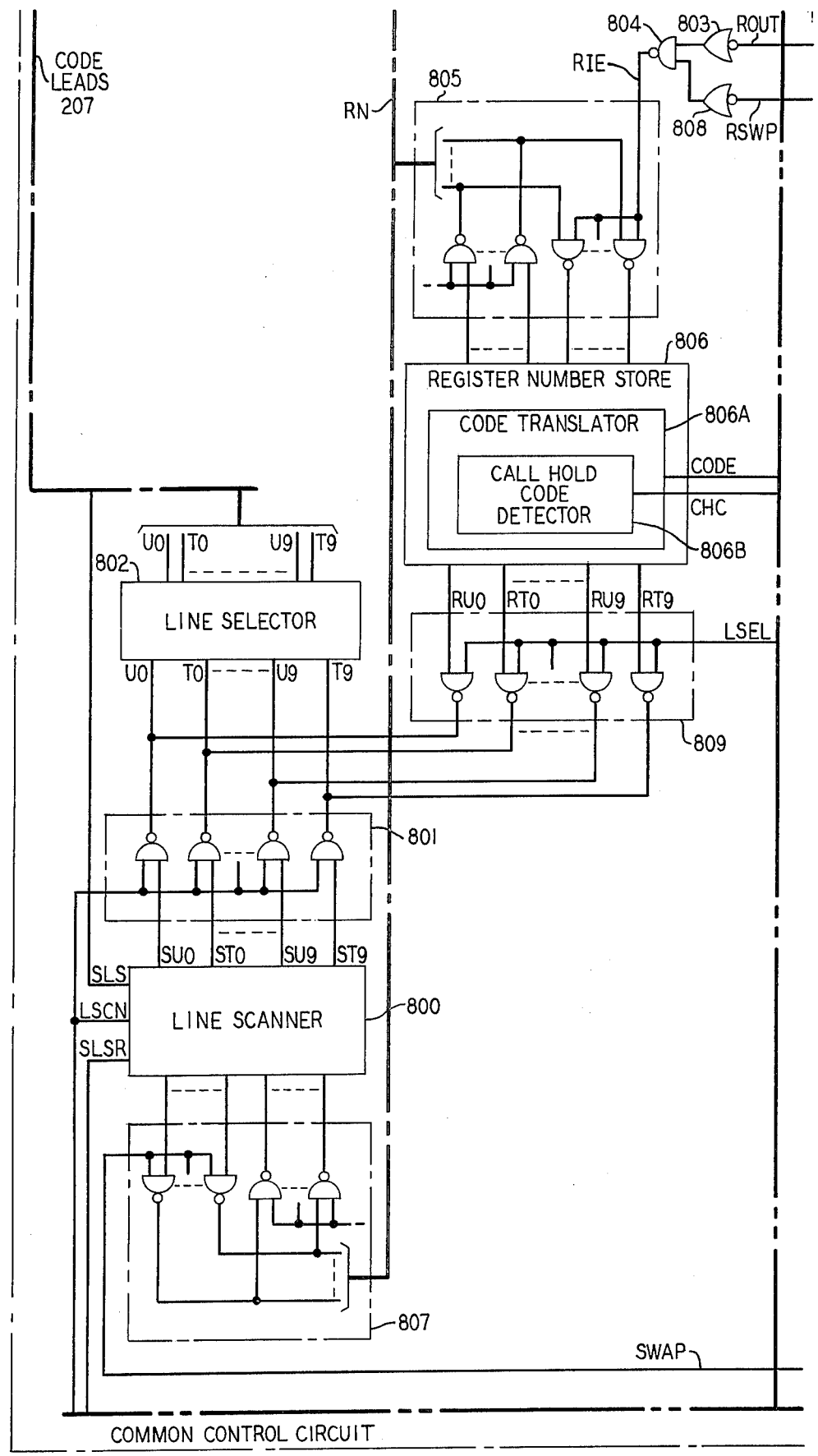

This identification operation is commenced when the callback subsequence circuit automatically advances to its section D and places a HIGH signal on conductor LSCN to activate the line scanner 800 on FIG. 8 and also enable the gating circuitry 801 on FIG. 8. The line scanner responds to the signal on conductor LSCN by varying the signals on its output leads. The varying line scanner outputs cause the line selector 802 to sequentially place a HIGH signal on conductors U0 through U9 and TO through T9, thereby enabling each line circuit LC00 through LC99 one at a time until the appropriate line circuit has been selected. In this case the appropriate line circuit is LC00 and when the line scanner places a HIGH signal on conductors UO and TO, gate 201 in line circuit LC00 turns ON. Gate 201 turning ON turns OFF gate 202 which places a HIGH signal on one of the inputs of gate 203. The other two inputs of gate 203 are (1) the previously mentioned HIGH signal on lead LCBE and (2) the HIGH output of gate 204. (Gate 204 is turned OFF by the LOW callback signal on the sleeve lead, conductor S.) The HIGH signals on all the inputs of gate 203 turn ON gate 203. Gate 203 turned ON causes line circuit LC00 to return a LOW signal to the line scanner on conductor SLS one of the code leads 207. This signal on conductor SLS stops the line scanner and causes it to place a HIGH signal on conductor SLSR, informing the callback subsequence circuit that the callback operation has been completed. The callback subsequence circuit responds to the signal on conductor SLSR by advancing to section E which places a HIGH signal on conductor CBRE. The signal on lead CBRE turns ON gate 504 which turns OFF gate 505, placing a HIGH signal on conductor CBR. The signal on lead CBR resets the callback subsequence circuit and returns control to the call transfer request mode circuit.

CALL TRANSFER CIRCUIT CONNECT

At this point, the station party is still connected to the central office trunk 300-0. The line scanner has stored in it the identity of line circuit LC00 and line circuit LC00 is still selected by the signals on the output of the line selector. Central office trunk circuit 300-0 is selected by the outputs of the trunk scanner portion of the service request scanner. The next step in processing the call sequence is to locate an idle call transfer circuit and connect both the C.O. trunk and the station to it.

Now that the callback subsequence has been completed, the call transfer request mode circuit advances to section E and places a HIGH signal on conductor SICT. The signal on lead SICT activates the call transfer circuit scanner portion 607C of the idle circuit scanner 607 on FIG. 6. The call transfer circuit scanner portion 607C of the idle circuit scanner searches for an idle call transfer circuit by sequentially placing ground on code lead 311 conductors ICTO through ICTK, thereby checking the status of each call transfer circuit.

Figure 3:
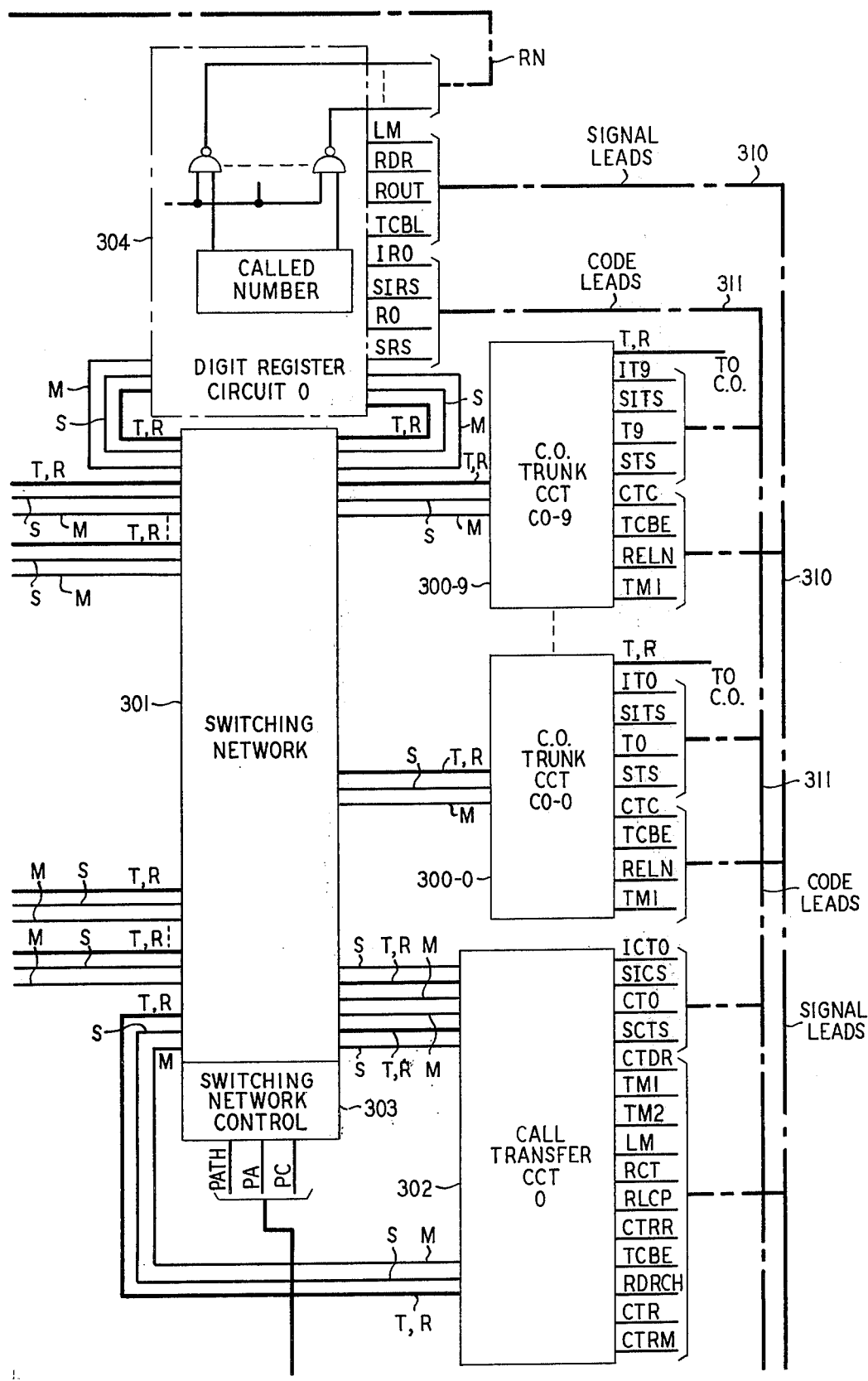

When an idle call transfer circuit is located, in this case, circuit 302 on FIG. 3 that call transfer circuit responds by placing a LOW signal on conductor SICS one of the code leads 311. The LOW signal on conductor SICS stops the idle circuit scanner and indicates that an idle call transfer circuit has been located. The idle circuit scanner forwards this information to the common control circuit by placing a HIGH signal on conductor CTS to the call transfer request mode circuit 500 which responds by advancing to section F and places a HIGH signal, doubly inverted by gates 507 and 513, on conductor TM2 which is one of the signal leads 310 to the call transfer circuit. The HIGH signal on conductor TM2 causes the call transfer circuit, 302, which is still selected by the idle circuit scanner 607, to mark one of its trunk side network appearances by placing a LOW signal on the conductor M associated with that appearance.

The call transfer request mode circuit automatically advances to section G and places a HIGH signal, doubly inverted by gates 508 and 514, on conductor LLM. This signal on lead LLM causes gate 206 of line circuit LC00 to turn ON. Line circuit LC00 is still selected by the outputs of the line selector and gate 201 is ON while gate 202 is OFF. The LOW output of gate 206 serves to mark the line side network appearance of the line circuit by placing a LOW signal on the M conductor associated with that network appearance. The call transfer request mode circuit automatically advances to section H and places a HIGH signal on conductor RELN. The signal on conductor RELN signals the selected central office trunk circuit 300-0, to release the network connection between itself and line circuit LC00. The selected central office trunk circuit releases the network connection to line circuit LC00 by removing the holding potential from the sleeve lead S.

The switching network control 303 of FIG. 3 is activated by the fact that there is a marked appearance on both the trunk side and the line side of the network. The switching network control now determines that there is a path available between the marked line side network appearance of line circuit LC00 and the marked trunk side network appearance of the call transfer circuit. When an available path is located, the switching network control places a HIGH signal on conductor PA to the call transfer request mode circuit which responds by advancing to section I.

Section I of the call transfer request mode circuit places a HIGH signal, doubly inverted by gates 509 and 512, on conductor PATH, which directs the switching network control to establish a path between the two marked network appearances. The switching network control now causes the switching network 301 on FIG. 3 to establish a network connection between the marked line side network appearance and the marked trunk side network appearance. The switching network control places a HIGH signal on conductor PC to indicate that the path is complete. This HIGH signal on conductor PC causes the call transfer request mode circuit to advance to section J and to place a HIGH signal on conductor TM1 which is one of the signal leads 310 to the central office trunk circuit 300-0. The HIGH signal on conductor TM1 is inverted gate 510 and turns OFF gates 507, 508, and 509, removing the mark signals from leads TM1 and LLM and the HIGH signal on the PATH lead. The HIGH signal on conductor TM1 causes the central office trunk circuit, still selected by the service request scanner 600, to mark its trunk side network appearance by placing a LOW signal on its conductor M.

The call transfer request mode circuit automatically advances to section K and places a HIGH signal on conductor LM which is also one of the conductors in signal leads 310 to the call transfer circuit. The HIGH signal on conductor LM to the call transfer circuit, still selected by the idle circuit scanner, causes that call transfer circuit to mark its line side network appearance by placing a LOW signal on the conductor M associated with its line side network appearance.

The switching network control 303 is once again activated by the fact that there is both a marked trunk side appearance and a marked line side appearance on the network. The switching network control determines that there is a path available between the marked line side appearance and the marked trunk side appearance and conveys this information to the call transfer request mode circuit by placing a HIGH signal on conductor PA. The HIGH signal on conductor PA causes the call transfer request mode circuit to advance to section L and to place a HIGH signal, doubly inverted by gates 511 and 512, on conductor PATH which signals the switching network control to establish a path between these two marked network appearances. The switching network control causes the switching network to establish a network connection between the marked line side network appearance of the call transfer circuit and the marked trunk side network appearance of the central office trunk. Now, the switching network places a HIGH signal on conductor PC to the call transfer request mode circuit indicating that the network path is complete.

The call transfer request mode circuit responds to this signal by advancing to section M and places a HIGH signal on conductor RSE, resetting the call transfer request mode circuitry. The resetting of the call transfer request mode circuit causes the service request scanner, the idle circuit scanner and the line selector to go idle. This removes the selection from the central office trunk, the line circuit, and the call transfer circuit. The HIGH signal on conductor RSE also turns ON gate 901 on FIG. 9 which turns OFF gate 902 on FIG. 9 placing a HIGH signal on lead RESET to the mode control circuit 900 of the common control circuit. The HIGH signal on conductor RESET resets the mode control circuit and causes the common control circuit to go idle.

DIGIT REGISTER CONNECT

The present status of the call is that the line circuit LCOO is connected via the network to one of the trunk ports of the call transfer circuit and the central office trunk circuit is connected via the network to the line port of the same call transfer circuit. The call transfer circuit now places the central office trunk circuit on hold and requests the common control circuit to connect a digit register circuit to another trunk side network port of the same call transfer circuit.

The connection of a digit register to the call transfer circuit is initiated by the call transfer circuit placing a LOW signal on conductor CTDR which is one of the signal leads 310 to the common control circuit. The LOW signal on lead CTDR is inverted by gate 910 and causes section C of the mode control circuit to be activated in what is termed the "trunk dial tone mode" in which a register is connected to the trunk side network port of the circuit requesting service.

Section C of the mode control circuit places a HIGH signal on conductor TDT which activates the trunk dial tone mode circuit 903 on FIG. 9. Section B of the trunk dial tone mode circuit places a HIGH signal on conductor TSE which, in conjunction with previously mentioned signal on conductor TDT, enables gate 608 of the service request scanner 600 on FIG. 6. The trunk dial tone mode circuit now automatically advances to section C and places a HIGH signal on conductor SCAN which causes gate 608 of the service request scanner to turn ON, placing a LOW signal on conductor CTCS. The LOW signal on conductor CTCS activates the call transfer circuit scanner portion 600C of the service request scanner.

The call transfer circuit scanner sequentially places a HIGH signal on code lead 311 conductors CTO through CTk checking the status of each call transfer circuit until the one requesting service has been found. In this case the call transfer circuit requesting service is assumed to be in position O and when the call transfer circuit scanner places a HIGH signal on conductor CTO, the call transfer circuit in question responds by placing a LOW signal on code lead 311 conductor SCTS to the service request scanner, causing the service request scanner to stop scanning. The service request scanner places a HIGH signal on conductor SS, signaling the trunk dial tone mode circuit that the circuit requesting service has been located.

Figure 6:
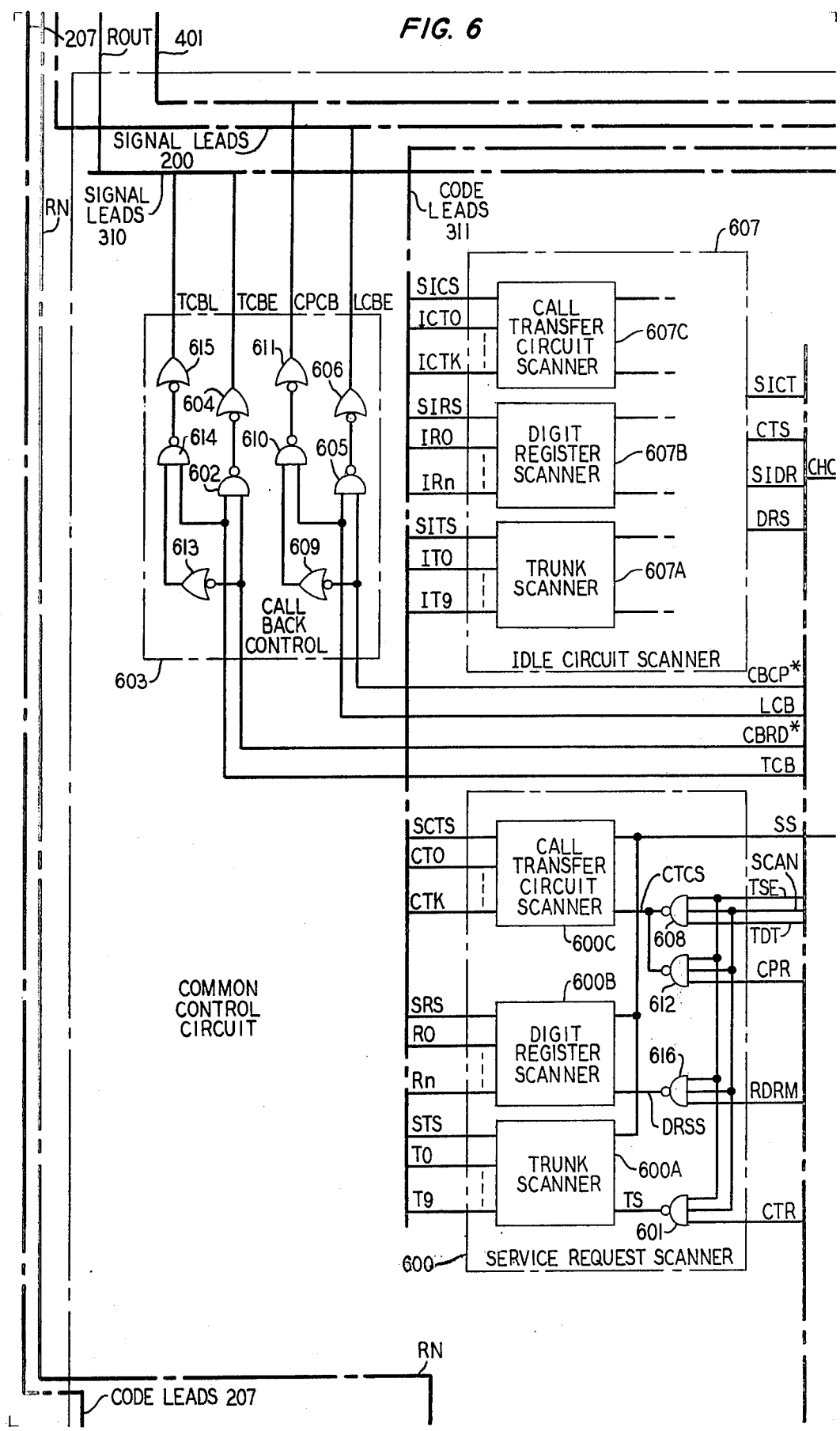

The trunk dial tone mode circuit responds to the signal on lead SS by advancing to section D, which places a HIGH signal on conductor SIDR to the idle circuit scanner 607 on FIG. 6. The signal on lead SIDR activates the digit register scanner portion 607B of the idle circuit scanner and causes it to sequentially place a HIGH signal on the code lead 311 conductors IRO through IRn, checking the status of each digit register in the system until an idle one is located. When an idle digit register is located, in this case in position O, the digit register 304 returns a LOW signal on code lead 311 conductor SIRS to the idle circuit scanner stopping the idle circuit scanner. The idle circuit scanner places a HIGH signal on conductor DRS to the trunk dial tone mode circuit indicating that an idle digit register has been selected.

The trunk dial tone mode circuit advances to section E and places a HIGH signal on conductor LM which is one of the signal leads 310 to the digit register circuit 304. The HIGH signal on conductor LM causes the idle digit register, selected by the idle circuit scanner, to mark its line side network appearance by placing a LOW signal on conductor M of its line side network appearance. The trunk dial tone mode circuit automatically advances to section F and places a HIGH signal on conductor TM1 which is also one of the signal leads 310 to the call transfer circuit. The HIGH signal on conductor TM1 causes the call transfer circuit, selected by the service request scanner, to mark another one of its trunk side network appearances by placing a LOW signal on the conductor M of that trunk side network appearance.

The switching network control 303 is activated by the appearance of both a marked trunk side appearance and a marked line side appearance on the network. The switching network control circuit determines that there is a path between the two marked network appearances and conveys this information back to the trunk dial tone mode circuit by placing a HIGH signal on conductor PA. The trunk dial tone mode circuit responds to this signal on conductor PA by advancing to section G and by placing a HIGH signal on conductor PATH to the switching network control. The switching network control causes the switching network to establish a network connection between the marked line side network appearance of the digit register and the marked trunk side network appearance of the call transfer circuit. When this path has been established, the switching network control places a HIGH signal on conductor PC to the trunk dial tone mode circuit indicating that the path has been completed. The trunk dial tone mode circuit responds to this signal by advancing to section H and placing a HIGH signal on conductor TDTR which resets the trunk dial tone mode circuit.

The resetting of the trunk dial tone mode circuit causes the service request scanner and the idle circuit scanner to return to the idle state, thereby removing the selection from the digit register circuit 304 and the call transfer circuit 302. The HIGH signal on conductor TDTR also causes gate 904 on FIG. 9, in the common control circuit to turn ON which turns OFF gate 902 placing a HIGH signal on conductor RESET which then resets the mode control cirucit 900 causing the common control circuit to go idle.

CALL HOLD CODE DIALED

The status of the call at this time is that station STOO is connected to digit register O through the call transfer circuit and the central office trunk circuit has been placed on hold by the call transfer circuit to which it is connected. Station STOO now hears dial tone from the digit register, through the call transfer circuit, and dials or keys (depending upon whether the station set is rotary dial or pushbutton, respectively) the call hold code digits in order that the existing call may be placed on hold and station STOO will be free to initiate a new call.

The dialed digits representing the call hold code are dialed directly into the digit register circuit and are stored in the digit register circuit. The digit register circuit requests the common control circuit to read out this dialed digit data by placing a LOW signal on conductor RDR which is one of the signal leads 310 to the common control circuit. A LOW signal on conductor RDR is inverted by gate 911 and activates section D of the mode control circuit 900 of FIG. 9 of the common control circuit which enters what is termed the "read digit register mode."

Figure 7:
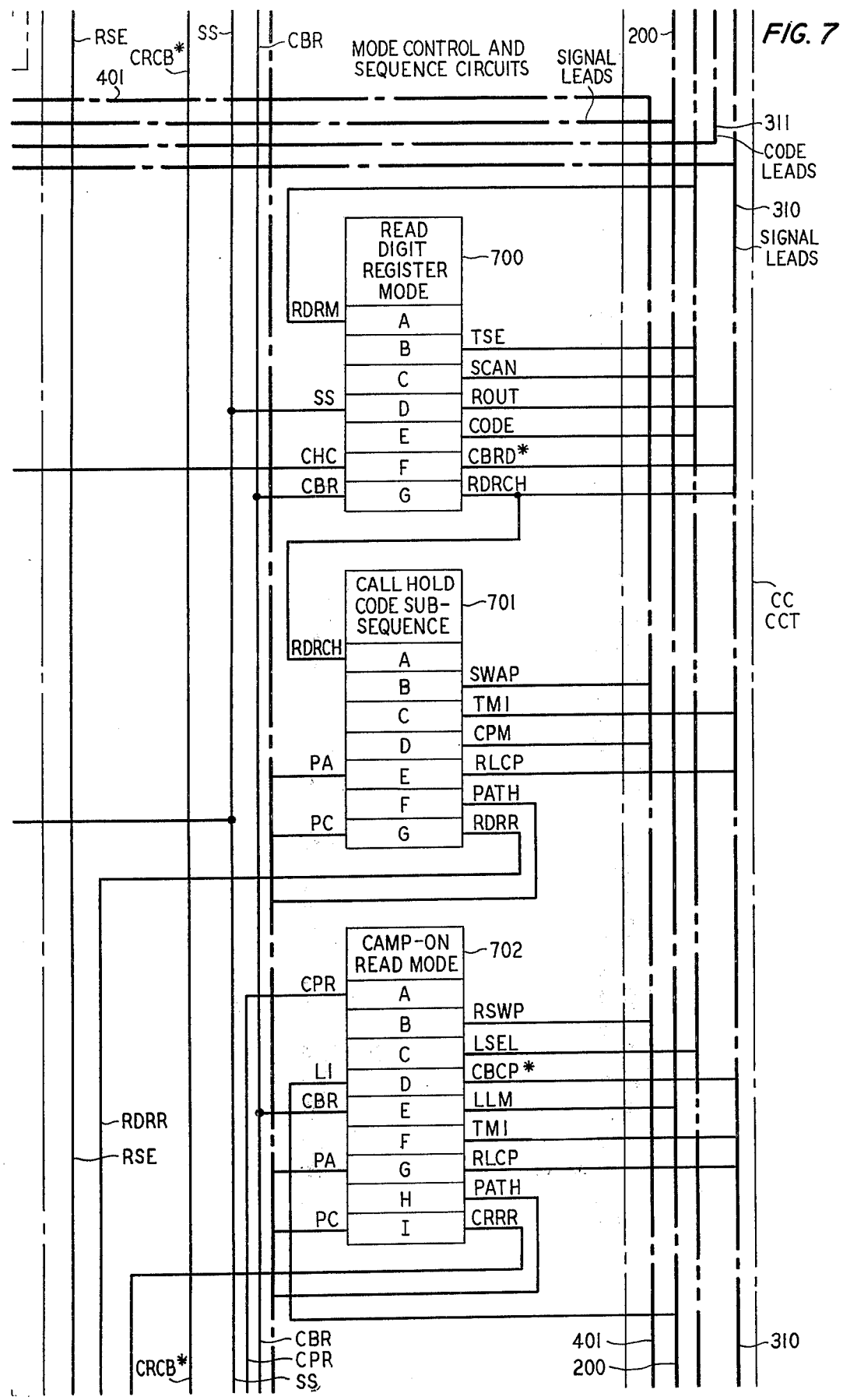

The mode control circuit responds to the HIGH signal on conductor RDR by placing a HIGH signal on conductor RDRM to activate the read digit register mode circuit 700 of FIG. 7 of the common control circuit. Section B of the read digit register mode circuit responds to the HIGH signal on conductor RDRM by placing a HIGH signal on conductor TSE. The signal on conductor TSE, in connection with the previously mentioned HIGH signal on conductor RDRM, enables gate 616 of the service request scanner 607. The read digit register mode circuit then automatically advances to section C and places a HIGH signal on conductor SCAN, turning ON gate 616, placing a LOW signal on lead DRSS. The signal on lead DRSS activates the digit register scanner portion 600C of the service request scanner 600 which scans for the digit register circuit requesting service. This is accomplished by the digit register scanner portion 607B of the service request scanner sequentially placing a HIGH signal on code lead 311 conductors RO through RN thereby checking the status of each digit register circuit until the one requesting service is found.

In this case the register requesting service is in position O and, when the digit register scanner places a HIGH signal on conductor Ro, the digit register circuit 304 responds by placing a LOW signal on code lead 311 conductor SRS indicating to the service request scanner that the circuit requesting service has been located. The service request scanner then places a HIGH signal on conductor SS indication to the read digit register mode circuit that the circuit requesting service has been located.

The read digit register mode circuit responds to the signal on lead SS by advancing to section D and by placing a HIGH signal on conductor ROUT which is one of the signal leads 310 to the digit register circuit. This HIGH signal on conductor ROUT causes the digit register circuit to read out the dialed digit data onto the data bus leads RN to the common control circuit on FIG. 8. The HIGH signal on conductor ROUT also causes gate 803 on FIG. 8 in the common control circuit to turn ON which turns OFF gate 804, placing a HIGH signal on conductor RIE to the gating circuit 805 on FIG. 8 of the register number store 806 on FIG. 8. The HIGH signal on conductor RIE enables the input gating circuit of the register number store to read the dialed digit data from the data bus leads RN into the register number store. When sufficient time has elapsed to complete the transfer of the dialed digit data from the register circuit to the register number store of the common control circuit, the read digit register mode circuit automatically advances to section E and places a HIGH signal on conductor CODE. The HIGH signal on conductor CODE causes the code translator portion 806A of the register number store to check and see if the dialed digit data is a valid dial code.

Since a valid code, the call hold code, was dialed the code translator circuit activates the call hold detection circuit 806B of the register number store. This call hold detection circuit determines that the code dialed is the call hold code and places a HIGH signal on conductor CHC to the read digit register mode circuit. The HIGH signal on conductor CHC causes the read digit register mode circuit to advance to section F and place a LOW signal on conductor CBRD which turns OFF gate 501 on FIG. 5 of the common control circuit. Gate 501 turning OFF places a HIGH signal on conductor CBB which enables the callback subsequence circuit 502. This initiates a callback operation to determine the identity of the line circuit and the trunk involved in this call hold operation.

The callback subsequence circuit places a HIGH signal on conductor TCB which in conjunction with the previously mentioned LOW signal on lead CBRD* turning OFF gate 613, turns ON gate 614 of the callback control 603 on FIG. 6. Gate 614 turning ON turns OFF gate 615 of the callback control and places a HIGH signal on conductor TCBL which is one of the signal leads 310 to the digit register circuit 304. A HIGH on conductor TCBL causes the digit register circuit to call back the call transfer circuit 302 that is connected to the digit register line side network appearance. This is done by the digit register circuit placing a LOW signal on the sleeve lead, conductor S, to the call transfer circuit. The call transfer circuit responds to this signal by remembering that it has been called back. The called back call transfer circuit then calls back the line circuit by placing a LOW signal on the sleeve lead, conductor S, associated with the call transfer circuit trunk side network appearance that is connected to the line circuit.

The callback subsequence circuit automatically advances to section C and places a HIGH signal on conductor LCB which turns ON gate 605 of the callback control circuit. Gate 605 turning ON turns OFF gate 606 of the callback control circuit and places a HIGH signal on conductor LCBE which is one of the signal leads 200 to the line circuits. The HIGH signal on conductor LCBE enables the called back line circuit to be identified.

The callback subsequence circuit automatically advances to section D and places a HIGH signal on conductor LSCN to activate the line scanner circuit 800 and enable the gating circuit 801 on FIG. 8. The HIGH signal on conductor LSCN enables the gating circuit to pass the output signals from the line scanner onto the line selector 802 on FIG. 8. The HIGH signal on conductor LSCN also activates the line scanner which varies its output signals to sequentially seclect line circuit LC00 through LC99 via the line selector.

In this case the line circuit to be identified is line circuit LC00 and when the line scanner activates its outputs such that the line selector outputs U0 and T0 are HIGH, line circuit LC00 will be selected. In response to this selection, gate 201 of line circuit LC00 on FIG. 2 turns ON, turning OFF gate 202 which places a HIGH signal on one of the inputs of gate 203. The other two inputs of gate 203 are (1) the previously mentioned HIGH signal on lead LCBE and (2) the HIGH output of gate 204 (gate 204 is turned OFF by the LOW callback signal on the sleeve lead, conductor S). The HIGH signals on all the inputs of gate 203 turn ON gate 203. Gate 203 ON places a LOW signal on conductor SLS which is one of the code leads 207 to the line scanner, informing the line scanner that the called back line circuit has been located. The line scanner responds to the signal on lead SLS by placing a HIGH signal on conductor SLSR to the callback subsequence circuit to indicate that the line circuit has been located.

The callback subsequence circuit responds to the signal on lead SLSR by advancing to section E and places a HIGH signal on conductor CBRE which turns ON gate 504 which, in turn, turns OFF gate 505 placing a HIGH signal on conductor CBR. The HIGH signal on conductor CBR resets the callback subsequence circuit and also indicates to the read digit register mode circuit that the callback subsequence has been completed. The HIGH signal on conductor CBR causes the read digit register mode circuit to advance to section G and to place a HIGH signal on conductor RDRCH which causes the call transfer circuit to release the network connection to the digit register circuit and which activates the call hold subsequence circuit 701 on FIG. 7.

CALL TRANSFER CIRCUIT CONNECTION TO THE CAMP-ON CIRCUIT

Figure 4:
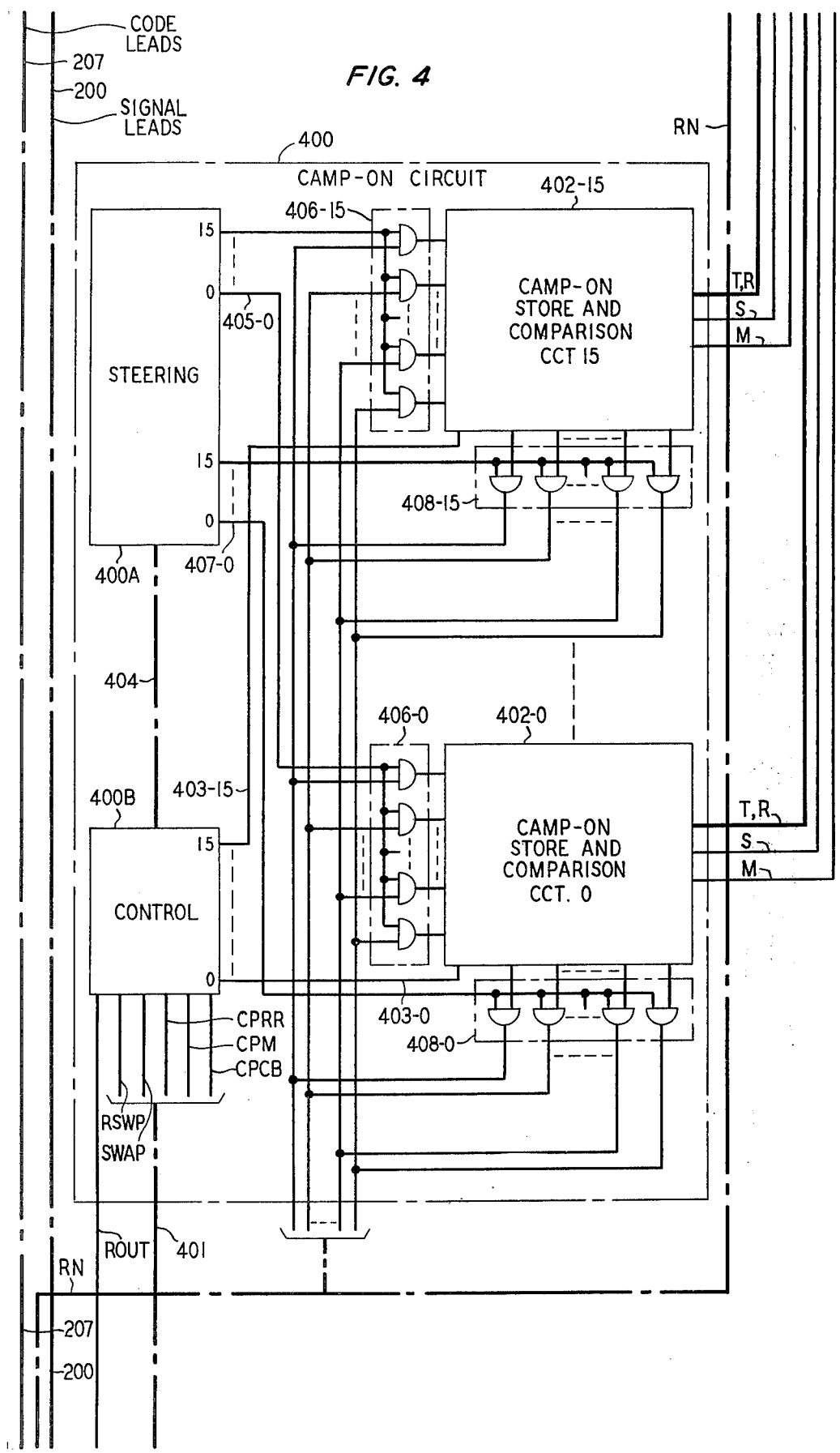

Section B of the call hold code subsequence circuit responds to the HIGH signal on conductor RDRCH by placing a high signal on conductor SWAP to the gating circuit 807 of FIG. 8 of the common control circuit and to the camp-on circuit 400 on FIG. 4 by way of signal leads 401. The HIGH signal on conductor SWAP causes the gating circuit 807 to read out the contents of the line scanner, which presently is the number of the called back line circuit, onto the data bus leads RN. The HIGH signal on conductor SWAP also activates the control protion 400B of the camp-on circuit 400.

The control portion of the camp-on circuit determines the busy/idle status of the camp-on stores 402-0 through 402-15 by scanning the control leads 403-0 through 403-15 associated with the respective camp-on stores and selects an idle camp-on store for use in this call. Let us assume that the idle camp-on store selected is 402-0. The control portion 400B of the camp-on circuit now signals the steering portion 400A of the camp-on circuit by way of signal leads 404 that an idle camp-on store has been located and also transmits the identity of this camp-on store to the steering circuit. The steering circuit responds by placing a HIGH signal on conductor 405-0 to the input gating circuit 406-0 associated with that idle camp-on store. This signal causes the input gating circuit to read in the number from the data bus leads RN into the camp-on store 402-0, storing the identity of the called back line circuit in the selected idle camp-on store.

The call hold code subsequence circuit automatically advances to section C and places a HIGH signal on conductor TM1 to the called back call transfer circuit. The signal on lead TM1 causes the call transfer circuit to mark its trunk side network appearance that is connected to the station party by placing a LOW signal on the conductor M associated with that network appearance.

The call hold code subsequence circuit automatically advances to section D and places a HIGH signal on conductor CPM to the camp-on circuit. The HIGH signal on conductor CPM causes the control portion of the camp-on circuit to place a signal on the control leads 403-0 causing the selected camp-on store to mark its line side network appearance by placing a LOW signal on its conductor M.

The switching network control 303 ON FIG. 3 is activated by the appearance of a marked appearance on either side of the switching network. The switching network control determines that there exists an idle path between the two marked network appearances and places a HIGH signal on conductor PA to the call hold code subsequence circuit indicating that there is a path available between the two marked network appearances.

The call hold code subsequence circuit responds to the signal by advancing to section E and by placing a HIGH signal on conductor RLCP which is one of the signal leads 310 to the selected call transfer circuit 302. The HIGH signal on conductor RLCP causes the call transfer circuit to release the network connection to the station party that is requesting call hold service so that the station party may initiate another call. The call hold code subsequence circuit advances to section F after a timing period and places a HIGH signal on conductor PATH to the switching network control. This signal on lead PATH causes the switching network control to establish a network connection between the marked line side network appearance of the camp-on store 402-0 and the marked trunk side network appearance of the call transfer circuit. Once this connection is established, the switching network control responds by placing a HIGH signal on conductor PC to the call hold code subsequence circuit indicating that the path is complete.

The call hold code subsequence circuit responds to this signal by advancing to section G and by placing a HIGH signal on conductor RDRR which resets the call hold code subsequence circuit and the read digit register mode circuit and also turns ON gate 905 on FIG. 9 which turns OFF gate 902 placing a HIGH signal on conductor RESET, resetting the mode control circuit 900 of the common control circuit.

CALL ON HOLD

The status of the call at this time is that the central office trunk circuit has been placed on hold by being connected to the camp-on store via the call transfer circuit. The camp-on store circuit contains the line circuit identity of the station that placed this call on hold and that station has been released and is now free to initiate another call. The central office trunk circuit will remain on hold until the station ST00 completes the new call and returns to the idle state at which time he will be reconnected to the held central office trunk circuit.

Each camp-on store periodically initiates a sequence called the camp-on read mode in which the camp-on store reads out its contents, a line circuit number, to the line scanner which uses this line circuit identity to determine the status of the associated station. If the station is idle, the common control circuit establishes a connection between the line circuit whose identity is stored in the camp-on store and the call transfer circuit that is connected to the camp-on store line side network appearance. The call transfer circuit then requests the call transfer release mode which results in the station being connected directly to the central office trunk.

RELEASING HELD CALL

Let us now return to the call that is in progress. Let it be assumed that the user of station ST00 has just terminated his new call and is now idle. The control portion 400B of the camp-on circuit 400 periodically determines the status of each camp-on store in the camp-on circuit. Let us now assume that the control portion of the camp-on circuit is checking the status of camp-on store number 0.

Camp-on store O contains the identity of line circuit LC00 which is the line circuit associated with station ST00 that placed a call on hold. Camp-on store O indicates to the control portion of the camp-on circuit that a number is stored in this particular camp-on store. The control portion of the camp-on circuit responds to this information by placing a HIGH signal on conductor CPRR which is one of the signal leads 401 to the common control circuit. The HIGH signal on conductor CPRR activates section E of the mode control portion 900 of the common control circuit which responds by entering what is called the "camp-on read mode" in which the contents of a camp-on store are read out and the status of the call associated with this data is determined.

The mode control circuit places a HIGH signal on conductor CPR to the camp-on read mode portion 702 on FIG. 7 of the common control circuit. Section B of the camp-on read mode circuit responds to the signal on lead CPR by placing a HIGH signal on conductor RSWP which is one of the signal leads 401 to the camp-on circuit. The control portion of the camp-on circuit responds to the HIGH signal on conductor RSWP by transmitting the identity of camp-on store O by way of signal leads 404 to the steering portion 400A of the camp-on circuit. The steering portion of the camp-on circuit then places a HIGH signal on conductor 407-0 to the output gating circuit 408-0 associated with camp-on store O. This causes the number that is stored in the camp-on store O, the identity of line circuit LC00, to be read out onto the data bus leads RN. The HIGH signal on conductor RSWP also turns ON gate number 808 on FIG. 8 in the common control circuit which, in turn, turns OFF gate number 804 placing a HIGH signal on conductor RIE to the input gating circuit 805 of the register number store 806. The HIGH signal on conductor RIE causes the number that is on the data bus leads RN to be read into the register number store.

The camp-on read mode circuit automatically advances to section C and places a HIGH signal on conductor LSEL which enables the output gating circuit 809 on FIG. 8 of the register number store 806. This causes the number that was just stored in the register number store to be transmitted to the line selector 802 on leads UO through T9. The line selector now contains the identity of line circuit LCOO and selects line circuit LCOO by placing the appropriate signals on the leads UO and TO which are two of the code leads 207 to the line circuits. Gate 201 of line circuit LCOO responds to the HIGH signals on conductor UO and TO by placing a LOW signal on the input of gate 202 which turns OFF and places a HIGH signal on the input of gate 208. The other input of gate 208 comes from the supervision portion 209 of line circuit LCOO and is HIGH to indicate that line circuit LCOO is idle. The two HIGH inputs of gate 208 cause it to turn ON, placing a LOW signal on conductor LI to indicate that the line circuit is idle. The LOW signal on signal lead 200 conductor LI causes the camp-on read mode circuit to advance to section D and place a LOW signal on conductor CBCP*. The signal on lead CBCP* turns OFF gate 501 on FIG. 5 of the common control circuit, placing a HIGH signal on conductor CBB to the callback subsequence circuit 502 of the common control circuit.

The HIGH signal on conductor CBB activates the callback subsequence circuit. Section B of the callback subsequence circuit places a HIGH signal on conductor TCB to the callback control circuit 603 of the common control circuit. The HIGH signal on conductor TCB turns OFF gate 602 of the callback control which turns ON gate 603 placing a HIGH signal on conductor TCBE. The HIGH signal on conductior TCBE does not have any effect at this time because no circuit has been selected by the service request scanner 600 of the common control circuit. The callback subsequence circuit automatically advances to section C and places a HIGH signal on conductor LCB which, in conjunction with the LOW signal on conductor CBCP* turning OFF gate 609 of the callback control, turns ON gate 610 of the callback control circuit. Gate 610 turning ON, turns OFF gate 611 which places a HIGH signal on conductor CPCB to the camp-on circuit. The HIGH signal on conductor CPCB causes the control portion of the camp-on circuit to cause the selected camp-on store to call back the circuit that is connected to its line side network appearance, in this case call transfer circuit O, by placing a LOW signal on conductor S. Meanwhile, the HIGH signal on conductor LCB in conjunction with the HIGH signal from gate 506 turns ON gate 503 of the common control circuit which turns OFF gate 505 placing a HIGH signal on conductor CBR.

The HIGH signal on conductor CBR resets the callback subsequence circuit and causes the camp-on read mode circuit to advance to section E and place a HIGH signal on conductor LLM which is one of the signal leads 200 to the line circuits. The HIGH signal on conductor LLM causes gate 206 of the selected line circuit LCOO to turn ON, which places a LOW signal on conductor M thus marking the line side network appearance of line circuit LCOO. The camp-on read mode circuit automatically advances to section F and places a HIGH signal on conductor TM1 which is one of the signal leads 310 to the trunk circuits. The HIGH signal on conductor TM1 causes the called back circuit, which is call transfer circuit O, to mark one of its idle trunk side network appearances by placing a LOW signal on conductor M associated with that appearance. The switching network control 303 is activated by the appearance of a marked appearance on both sides of the switching network and determines that a path exists between the two marked network appearances. In response to this determination, the switching network control places a HIGH signal on conductor PA indicating that there is a path available. The HIGH signal on conductor PA causes the camp-on read mode circuit to advance to section G and to place a HIGH signal on conductor RLCP which is one of the signal leads 310 to the trunk circuits. The HIGH signal on conductor RLCP causes the called back call transfer circuit to release the network connection from the camp-on circuit to one of its trunk side network appearances.

After a timing period, the camp-on read mode circuit advances to section H and places a HIGH signal on conductor PATH to the switching network control causing the switching network to establish a network connection between the two marked network appearances. When the network path is completed, the switching network control responds by placing a HIGH signal on conductor PC indicating that the path is complete. The HIGH signal on conductor PC causes the camp-on read mode circuit to advance to section I and to place a HIGH signal on conductor CRRR which resets the camp-on read mode circuit and turns OFF gate 906 of the common control circuit which turns OFF gate 902, placing a HIGH signal on conductor RESET which resets the mode control portion 900 of the common control circuit.

RETURN TO ORIGINAL CONNECTION

The present status of the call is that the station that placed the call on hold, station STOO, is now connected by way of the call transfer circuit to the central office trunk that was placed on hold.

The call transfer circuit now requests release of the network connections between line circuit LCOO and the call transfer circuit trunk side network appearance and the central office trunk circuit and the call transfer circuit line side network appearance. This is done by the call transfer circuit placing a LOW signal on conductor CTRR which is inverted by gate 912 and activates section F of the mode control portion 900 of the common control circuit. The mode control circuit responds by entering what is called the "call transfer release mode" and places a HIGH signal on conductor CTRM which activates the call transfer release mode circuit 907 of the common control circuit. The HIGH signal on conductor CTRM is also transmitted to the call transfer circuits indicating that the common control circuit has entered the call transfer release mode. Section B of the call transfer release mode circuit responds to the signal on lead CTRM by placing a HIGH signal on conductor TSE to the service request scanner 600 of the common control circuit. The HIGH signal on conductor CTSE in conjunction with the previously mentioned HIGH signal on conductor CPR enables gate 612 of the call transfer circuit scanner portion 600C of the service request scanner.

The call transfer release mode circuit automatically advances to section C and places a HIGH signal on conductor SCAN. The signal on lead SCAN turns ON gate 612, placing a LOW signal on conductor CTCS. The LOW signal on lead CTCS activates the call transfer circuit scanner which sequentially places a HIGH signal on code lead 311 conductors CTO through CTk until the circuit requesting service has been located.

In this case the circuit requesting service is call transfer circuit O so when the call transfer circuit scanner places a HIGH signal on conductor CTO, the call transfer circuit 302 responds by returning a LOW signal on code lead 311 conductor SCTS stopping the call transfer circuit scanner and indicating that the appropriate circuit has been located. The service request scanner responds to this signal by placing a HIGH signal on conductor SS to the call transfer release mode circuit which responds by advancing to section D and by placing a LOW signal on conductor CRCB*. The LOW signal on conductor CRCB* turns OFF gate 501 of the common control circuit which places a HIGH signal on conductor CBB enabling the callback subsequence circuit 502 of the common control circuit.

Section B of the callback subsequence circuit places a HIGH signal on conductor TCB to the callback control circuit 603. The HIGH signal on conductor TCB turns ON gate 602 of the callback control which turns OFF gate 604 placing a HIGH signal on conductor TCBE which is one of the signal leads 310 to the trunk circuits. The HIGH signal on conductor TCBE causes the circuit that has been selected by the service request scanner, in this case call transfer circuit O, to call back the line circuit that is connected to its trunk side network appearance by placing a LOW signal on its conductor S. The call transfer circuit also calls back the trunk circuit that is connected to its line side network appearance by placing a LOW signal on its conductor S. The called back trunk remembers that it has been called back.

The callback subsequence circuit automatically advances to section C and places a HIGH signal on conductor LCB which turns ON gate 605 of the callback control circuit which, in turn, turns OFF gate 606 placing a HIGH signal on conductor LCBE which is one of the signal leads 200 to the line circuits. The callback subsequence circuit automatically advances to section D and places a HIGH signal on conductor LSCN to the line scanner. The HIGH signal on conductor LSCN enables the output gating circuit 801 of the line scanner and also causes the line scanner 800 to begin scanning to locate the called back line circuit.

The line scanner output causes the line selector 802 to sequentially place a HIGH signal on conductors UO through U9 and TO through T9 which are the selection leads 207 to the line circuits. When the appropriate combination of selection leads 207 have been activated, in this case UO and TO, the called back line circuit LCOO will respond to these signals and to the HIGH signal on conductor LCBE. In response to the selection signals on leads UO and TO, gate 201 of line circuit LCOO turns ON turning OFF gate 202 which places a HIGH signal on one of the inputs of gate 203. The other two inputs of gate 203 and (1) the previously mentioned HIGH signals on lead LCBE and (2) the HIGH output of gate 204 (gate 204 is turned OFF by the LOW callback signal on the sleeve lead, conductor S). The HIGH signals on all the inputs of gate 203 turn ON gate 203 placing a LOW signal on conductor SLS indicating to the line scanner 800 that the called back line circuit has been located and scanning can be stopped.

The line scanner stops scanning and places a HIGH signal on conductor SLSR which causes the callback subsequence circuit to advance to section E and to place a HIGH signal on conductor CBRE which turns ON gate 504, turning OFF gate 505, placing a HIGH signal on conductor CBR. The HIGH signal on conductor CBR resets the callback subsequence circuit and causes the call transfer release mode circuit to advance to section E and to place a HIGH signal on conductor TM1 which is one of the signal leads 310 to the trunk circuits. The called back trunk circuit responds to the HIGH signal on conductor TM1 by marking its trunk side network appearance by placing a LOW signal on conductor M.

The call transfer release mode circuit automatically advances to section F and places a HIGH signal on conductor LLM which is one of the signal leads 200 to the line circuits. The selected line circuit responds to the HIGH signal on conductor LLM by gate 206 turning ON, thus marking its line side network appearance by placing a LOW signal on conductor M. The switching network control circuit 303 is activated by the incidence of a marked appearance on both sides of the switching network and the switching network control determines that a path exists between the two marked network appearances.

The switching network control responds to the fact that a path exists by placing a HIGH signal on conductor PA to the call transfer release mode circuit indicating that a path is available. The call transfer release mode circuit responds by advancing to section G and by placing a HIGH signal on conductor RCT which is one of the signal leads 310 to the trunk circuits. The selected call transfer circuit responds to the HIGH signal on conductor RCT by releasing the network connections from line circuit LCOO to its trunk side network appearance and from the central office trunk circuit to its line side network appearance.

The call transfer release mode circuit, after a timing period, advances to section H and places a HIGH signal on conductor PATH causing the switching network control to establish a network connection between the two marked network appearances. Once the path is established, the switching network control places a HIGH signal on conductor PC indicating to the call transfer release mode circuit that the path is complete. The call transfer release mode circuit responds by advancing to section I and by placing a HIGH signal on conductor CRR which resets the call transfer release mode circuit and turns ON gate 908 placing a HIGH signal on the input of gate 902 turning it OFF, thus placing a HIGH signal on conductor RESET which resets the mode control circuit 900 of the common control circuit. The present status of the call is that station STOO is now directly connected to the central office trunk circuit as it was at the beginning of the call sequence.

While a specific embodiment of the invention has been disclosed, variations in procedural and structural detail within the scope of the appended claims are possible, and are contemplated. There is no intention of limitation to what is contained in the abstract or the exact disclosure as herein presented. The above-described arrangements are only illustrative of the application of the principles of the invention. Numerous other arrangements may be devised by those skilled in the art without departing from spirit and scope of the invention.

What is claimed is:

1. In a telephone switching system wherein communication connections are established between stations and trunk circuits, a hold arrangement comprising:
a digit register circuit,
means for connecting said digit register circuit to an existing communication connection between a station and a first trunk circuit, said connecting means being activated by a switchook flash from said station,
means for detecting the dialing of digits representing a call hold code into said digit register circuit from said station,
means responsive to a detected dialed call hold code for placing said first trunk circuit in a hold state,
means also responsive to a detected dialed call hold code for releasing said communication connection from said station to said digit register circuit and for establishing a second communication connection from said station to a second trunk circuit, and
means for reestablishing said communication connection from said station to said first trunk circuit, said reestablishing means being activated by the release of said second communication connection.

2. The invention recited in claim 1 wherein said placing means includes a camp-on circuit for maintaining said first trunk circuit in a hold state.

3. The invention recited in claim 2 wherein said camp-on circuit includes a plurality of data storage means for the storing of data identifying the station that placed said first trunk circuit in a hold state.

4. The invention recited in claim 3 further comprising means for determining the busy/idle status of said station.

5. The invention recited in claim 4 wherein said camp-on circuit periodically reads the data out of each said data storage means for the determination by said determining means of the busy/idle status of each such identified station.

6. The invention recited in claim 1 wherein said reestablishing means is activated by said station transferring said second communication connection from said station to another one of said stations.

7. The invention recited in claim 1 wherein said reestablishing means is activated by said connecting means in combination with said detecting means and said placing means.

8. The invention recited in claim 1 wherein said reestablishing means is activated by said station going on hook while connected to said second trunk circuit.

9. In a telephone switching system, a switching network having a line side and a trunk side, wherein network connections are established between the line side and the trunk side of said network, a plurality of line circuits connected to said line side of said network, a plurality of trunk circuits connected to said trunk side of said network,
a digit register circuit connected to both said line side and said trunk side network, a call transfer circuit connected to both said line side and said trunk side of said network, a camp-on circuit connected to said line side of said network, a hold arrangement comprising:
means for releasing an existing network connection between a first trunk circuit and a line circuit, said releasing means being activated by a switchhook flash from said station,
means responsive to said releasing means for establishing network connections from said line circuit and said first trunk circuit to said call transfer circuit,
said establishing means additionally responsive to said releasing means for establishing a network connection from said call transfer circuit to said digit register circuit,
means for detecting the dialing of digits representing a call hold code into said digit register circuit from said line circuit,
second releasing means responsive to a detected dialed call hold code for releasing said network connections from said line circuit and said digit register circuit to said call transfer circuit,
said second releasing means additionally responsive to a detected dialed call hold code for establishing a network connection between said call transfer circuit and said camp-on circuit,
means responsive to a detected dialed call hold code for placing said first trunk circuit in a hold state,
second establishing means responsive to said second releasing means for establishing a network connection between said line circuit and a second trunk circuit for the initiation of a new call by said line circuit, and
means for reestablishing said network connection from said line circuit to said first trunk circuit, said reestablishing means being activated by the release of said network connection from said line circuit to said second trunk circuit.

10. The invention recited in claim 9 wherein said camp-on circuit comprises a plurality of data storage means for the storing of data identifying the line circuit that placed said first trunk circuit on hold.

11. The invention recited in claim 10 wherein said identity of the line circuit that placed said first trunk circuit on hold is determined by said second releasing means and is additionally read into said camp-on circuit data storage means by said second releasing means.

12. The invention recited in claim 11 further comprising means for determining the busy/idle status of said line circuit.

13. The invention recited in claim 12 wherein said camp-on circuit periodically reads the data out of each said data storage means for the determination by said determining means of the busy/idle status of said identified line circuit.

14. The invention recited in claim 9 wherein said reestablishing means is activated by said line circuit transferring said network connection between said line circuit and said second trunk circuit to another one of said line circuits.

15. The invention recited in claim 9 wherein said reestablishing means is activated by said connecting means in combination with said detecting means and said placing means.

16. The invention recited in claim 9 wherein said reestablishing means is activated by said line circuit going on-hook while connected to said second trunk circuit.

17. The invention recited in claim 15 wherein said release of said network connection from said line circuit to said second trunk circuit is indicated to said reestablishing means by said determining means in determining the busy/idle status of said identified line circuit.

* * * * *